United States Patent
Carpenter, Jr. et al.

(10) Patent No.: US 9,374,623 B2
(45) Date of Patent: Jun. 21, 2016

(54) INTERACTIVE TELEVISION APPLICATION WITH NAVIGABLE CELLS AND REGIONS

(71) Applicant: Rovi Guides, Inc., Santa Clara, CA (US)

(72) Inventors: Kenneth F. Carpenter, Jr., Mount Laurel, NJ (US); Johnny B. Corvin, Jenks, OK (US); Bryan M. Drummond, Tulsa, OK (US); Michael D. Ellis, Boulder, CO (US); Edward B. Knudson, Lake Oswego, OR (US); Jeffrey B. Rush, Owasso, OK (US); Toby DeWeese, Tulsa, OK (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 14/729,734

(22) Filed: Jun. 3, 2015

(65) Prior Publication Data
US 2015/0271563 A1 Sep. 24, 2015

Related U.S. Application Data

(63) Continuation of application No. 14/174,587, filed on Feb. 6, 2014, now Pat. No. 9,071,877, which is a continuation of application No. 13/784,129, filed on Mar. 4, 2013, now Pat. No. 8,683,517, which is a
(Continued)

(51) Int. Cl.
*H04N 21/482* (2011.01)
*H04N 5/445* (2011.01)
*H04N 21/462* (2011.01)
*H04N 21/431* (2011.01)
(Continued)

(52) U.S. Cl.
CPC ....... *H04N 21/4821* (2013.01); *H04N 5/44543* (2013.01); *H04N 21/4312* (2013.01); *H04N 21/4316* (2013.01); *H04N 21/4622* (2013.01); *H04N 21/482* (2013.01); *H04N 5/45* (2013.01); *H04N 5/50* (2013.01)

(58) Field of Classification Search
USPC ............................. 725/38, 39, 41, 43, 46, 52
See application file for complete search history.

(56) References Cited

U.S. PATENT DOCUMENTS

| | | | |
|---|---|---|---|
| 5,544,354 A | 8/1996 | May et al. | |
| 5,583,560 A | 12/1996 | Florin et al. | |
| 5,585,838 A | 12/1996 | Lawler et al. | |

(Continued)

FOREIGN PATENT DOCUMENTS

| | | |
|---|---|---|
| WO | WO-98/26584 A1 | 6/1998 |
| WO | WO-9856176 A1 | 12/1998 |

(Continued)

OTHER PUBLICATIONS

Focus Highlight for World Wide Web Frames, IBM Technical Disclosure Bulletin, Nov. 1997, pp. 89-90.

*Primary Examiner* — Mulugeta Mengesha
(74) *Attorney, Agent, or Firm* — Ropes & Gray LLP

(57) ABSTRACT

An interactive television application with mosaic browsing is provided. Selectable cells that may be associated with entities are used to display information corresponding to the entities. Information may include brand marks such as logos or any other suitable entity identifier. A cell may be in focus or it may not be in focus. When a cell is in focus the information displayed in the cell may be different than the information displayed when the cell is not in focus. Users may navigate among cells. The cells may be grouped into regions based on, for example, their association with similar entities.

20 Claims, 36 Drawing Sheets

Related U.S. Application Data continuation of application No. 12/080,595, filed on Apr. 3, 2008, now Pat. No. 8,413,185, which is a continuation of application No. 09/773,883, filed on Jan. 31, 2001, now abandoned.

(60) Provisional application No. 60/179,523, filed on Feb. 1, 2000, provisional application No. 60/179,552, filed on Feb. 1, 2000.

(51) Int. Cl.
*H04N 5/45* (2011.01)
*H04N 5/50* (2006.01)

(56) References Cited

U.S. PATENT DOCUMENTS

| | | |
|---|---|---|
| 5,594,509 A | 1/1997 | Florin et al. |
| 5,595,509 A | 1/1997 | Fry et al. |
| 5,621,456 A * | 4/1997 | Florin ............... H04N 5/4403 348/E5.103 |
| 5,805,763 A | 9/1998 | Lawler et al. |
| 5,815,145 A | 9/1998 | Matthews, III |
| 5,880,768 A | 3/1999 | Lemmons et al. |
| 5,903,314 A | 5/1999 | Niijima et al. |
| 5,917,492 A | 6/1999 | Bereiter et al. |
| 5,990,862 A | 11/1999 | Lewis |
| 6,020,930 A | 2/2000 | Legrand |
| 6,025,837 A | 2/2000 | Matthews, III et al. |
| 6,061,097 A | 5/2000 | Satterfield |
| 6,115,080 A * | 9/2000 | Reitmeier ............ H04N 5/4401 348/564 |
| 6,177,931 B1 | 1/2001 | Alexander et al. |
| 6,295,646 B1 | 9/2001 | Goldschmidt Iki et al. |
| 6,295,837 B1 | 10/2001 | Den et al. |
| 6,405,371 B1 * | 6/2002 | Oosterhout ........ H04N 5/44543 348/564 |
| 6,501,514 B1 | 12/2002 | Townsend et al. |
| 6,868,551 B1 * | 3/2005 | Lawler ............... H04N 5/44543 348/E5.105 |
| 2002/0026638 A1 | 2/2002 | Eldering et al. |
| 2002/0059593 A1 | 5/2002 | Shao et al. |
| 2008/0276283 A1 | 11/2008 | Boyer et al. |

FOREIGN PATENT DOCUMENTS

| | | |
|---|---|---|
| WO | WO-99/04561 A1 | 1/1999 |
| WO | WO-9903271 A1 | 1/1999 |
| WO | WO-9956466 A1 | 11/1999 |
| WO | WO-0005887 A1 | 3/2000 |

* cited by examiner

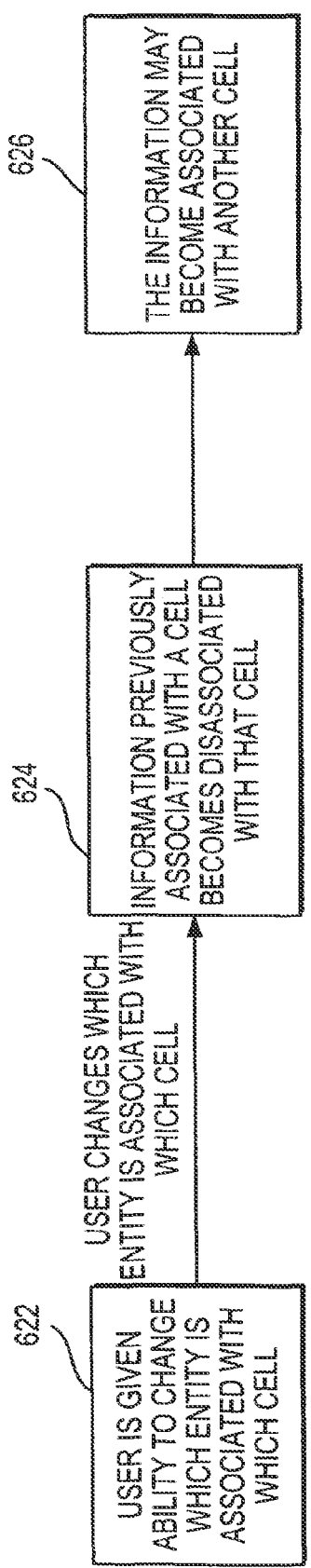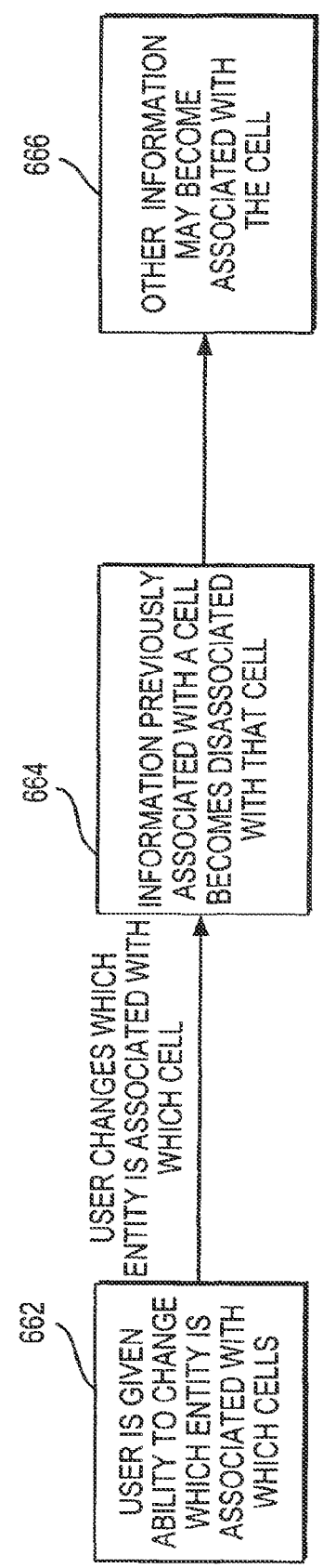
FIG. 10A
FIG. 10B

INTERACTIVE TELEVISION APPLICATION WITH NAVIGABLE CELLS AND REGIONS

This application is a continuation of U.S. patent application Ser. No. 14/174,587, filed Feb. 6, 2014 (currently allowed), which is a continuation of Ser. No. 13/784,129, filed Mar. 4, 2013, now U.S. Pat. No. 8,683,517, which is a continuation of Ser. No. 12/080,595, filed Apr. 3, 2008, now U.S. Pat. No. 8,413,185, which is a continuation of U.S. patent application Ser. No. 09/773,883, filed Jan. 31, 2001 (currently abandoned), which claims the benefit of U.S. provisional application Nos. 60/179,523, filed on Feb. 1, 2000 (currently expired), and 60/179,552, filed on Feb. 1, 2000 (currently expired), all of which are hereby incorporated by reference herein in their entireties.

BACKGROUND OF THE INVENTION

This invention relates to an interactive television application, and more particularly, to an interactive television application that may display selectable cells that display information.

Interactive television program guides that allow television program information to be displayed on a user's television have been developed. Interactive television program guides allow the user to navigate through television program information in the form of television program listings using a remote control.

Existing interactive television program guides generally offer program guide data in a manner that does not place much emphasis on the identification of entities that are related to program guide data. For example, program listings often show information regarding television programming in a neutral manner (i.e., information does not stand out). In particular, logos (e.g., of broadcasters) are given secondary consideration.

Because of the large amount of content that is provided by existing television systems to users, the structure of existing program guides makes it difficult to navigate among such a large amount of content. For example, cable service providers may offer hundreds of channels of television programming to users. Without an easy way to navigate through these channels, it may be impossible for a user to find a television program that the user would like to watch.

It is therefore an object of the present invention to provide systems and methods to present interactive television program guide data to users such that the interactive television program guide data is displayed in an attractive and easily identifiable way. It is also an object of the present invention to provide systems and methods that allow efficient navigation to similar interactive television program guide data.

SUMMARY OF THE INVENTION

These and other objects of the invention are accomplished in accordance with the principles of the present invention by providing an interactive television application in which selectable cells that may be associated with entities are used to display information corresponding to the entities.

The selectable cells may be partitions of a display screen. There may be any number of cells on a display screen. The cells may be any size and the cells may be any shape.

A particular entity may be associated with each cell. Information corresponding to the entity with which the cell is associated may be displayed in the cell. Cells associated with similar entities may be grouped together in regions. The user may navigate from an individual cell to another individual cell or from a region to another region by, for example, pressing arrow keys on a remote control device.

When navigating among regions, the user may switch to navigate among individual cells. When navigating among individual cells, the user may switch to navigate among regions.

When navigating among individual cells, one cell may be designated as being the cell "in focus." Typically, when cells are not in focus, brand marks may be displayed in those cells. When a cell is "in focus," information other than brand marks may be displayed in the cell. A highlight such as a yellow ring may be displayed around the cell "in focus" to indicate to the user which cell is "in focus."

When a cell is "in focus," it may be selected. Upon selection, a special feature may be initiated. The special feature initiated may depend on what type of entity with which the cell "in focus" is associated. For example, selecting a cell that is associated with a television channel may cause the interactive television program guide to display the video of the currently broadcasting television program of the associated television channel in full screen.

Further features of the invention, its nature and various advantages will be more apparent from the accompanying drawings and the following detailed description of the preferred embodiments.

BRIEF DESCRIPTION OF THE DRAWINGS

FIGS. 10A and 10B are flow charts of illustrative steps involved in entities associating and disassociating with a cell in accordance with the principles of one embodiment of the present invention.

DETAILED DESCRIPTION OF THE PREFERRED EMBODIMENTS

Figure 1:
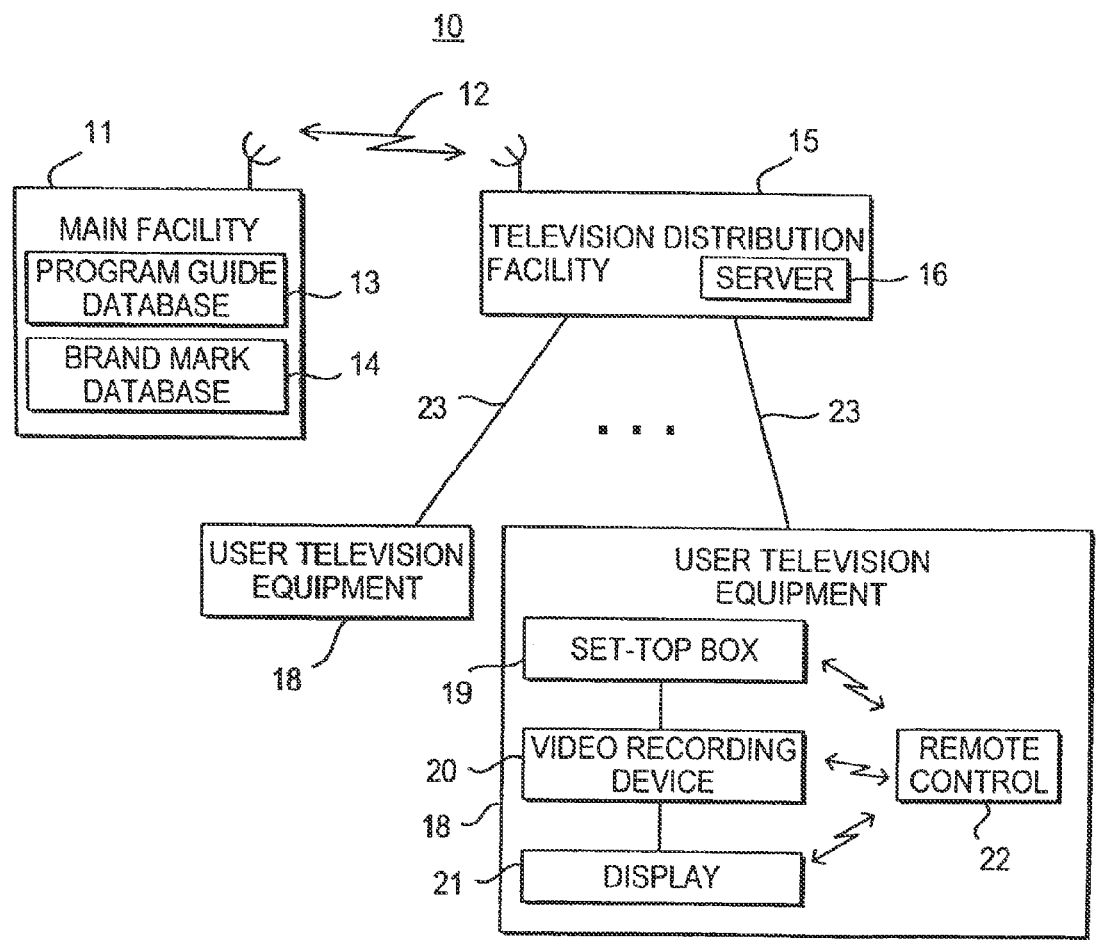
FIG. 1 is a block diagram of an illustrative mosaic browsing system in accordance with the principles of one embodiment of the present invention.

In one suitable embodiment of the present invention, one or more display screens of an interactive television application may be partitioned into display cells. For example, in one suitable approach, an entire television display screen may be partitioned into cells. The cells may be any suitable size and the cells may be any suitable shape. The cells may be located at any suitable location on the display screen. Each cell may contain any suitable brand mark of a particular television channel, program guide, program guide service provider, program guide operator, program guide programmer, television service provider, digital music programmer, company, product, service, radio station, web-site, or any other suitable entity. Brand marks may be any suitable text, image, video, or a combination of these elements that may serve to identify an entity. For example, brand marks may be logos, trade-marked identifiers, icons, or any other suitable brand identifiers. In one suitable approach, non-specific and customer specific logos may be displayed. The interactive television program guide may display its own brand mark on each display screen. The brand marks may be selectable.

The user of the interactive television application may navigate about the screen by, for example, pressing arrow keys on a remote control device. The cell to which the user navigates may become the cell "in focus." The interactive television application may denote a cell as being in focus by, for example, displaying a highlight around the cell in focus. The highlight may be any suitable highlight such as a yellow ring.

In one suitable embodiment, if a web-site (e.g., in the form of a Universal Resource Locator (URL)) is associated with a particular cell, the interactive television application may activate a web-browser and the associated web-site may be displayed. If a television channel is associated with a particular cell, user equipment (e.g., user television equipment, user computer equipment, or any other suitable user equipment) may tune to the television channel with which the cell is associated. Currently broadcasting programming video on the television channel may be scaled and displayed in that cell. The video may be scaled to fit the size of the cell. When the cell is in focus, and video from the corresponding channel is being displayed, the brand mark that may have originally been displayed in the cell may be removed.

The user may select the cell in focus by pressing a "select" key or an "ok" key on the remote control. Pressing the "select" key or the "ok" key while a cell is in focus may perform an action related to that cell. For example, selecting a cell with a television channel associated with it may cause the interactive television program guide to display the video of the currently broadcasting television program of the associated television channel in full screen. Selecting a cell that has a web-site associated with it may launch a web-browser that will automatically display the content of that web-site. Selecting a system operator's brand mark may take the user to a customer service feature. In another suitable approach, selecting a system operator's brand mark or a program guide's brand mark may take the user to a menu screen associated with the selected brand.

An illustrative interactive television application system 10 in accordance with the present invention is shown in FIG. 1. Illustrative interactive television application system 10 may comprise a main facility 11, a television distribution facility 15 and user television equipment 18. Main facility 11 may include a program guide database 13 for storing program guide information such as television program guide listings data, pay-per-view ordering information, television program promotional information, or any other suitable program guide information. Main facility 11 may also include a brand mark database 14 for storing brand marks. Brand marks may include text, images, graphics, video, a combination of these elements, or any other suitable form of brand mark. For example, brand marks may include logos, brand names, advertisements, electronic coupons, or any other suitable brand marks. Information from databases 13 and 14 may be transmitted to television distribution facility 15 via communications link 12. Link 12 may be a satellite link, a telephone network link, an Internet link, a cable or fiber optic link, a microwave link, a combination of such links, or any other suitable communications link. If it is desired to transmit video signals (e.g., for a brand mark in video format) over link 12 in addition to data signals, a relatively high bandwidth link such as a satellite link may be preferable to a relatively low bandwidth link such as a telephone line.

Television distribution facility 15 may be a facility for distributing television signals to users, such as a cable system headend, a broadcast distribution facility, or a satellite television distribution facility.

The program guide information transmitted by main facility 11 to television distribution facility 15 may include television program listings data such as program times, channels, titles, descriptions, or any other suitable program listings data. Transmitted program information may also include pay program data such as pricing information for individual programs and subscription channels, time windows for ordering programs and channels, telephone numbers for placing orders that cannot be impulse ordered, etc. The brand mark information transmitted by main facility 11 to television distribution facility 15 may include text, images, graphics, video, or a combination of these elements that may serve to identify an entity. For example, brand marks may be logos, trade-marked identifiers, icons, or any other suitable brand identifier for any suitable entity. If desired, some of the program guide information and brand mark information may be provided using data sources at facilities other than main facility 11. For example, data related to pay program order processing (e.g., billing data and the like) may be generated by an order processing and billing system that is separate from main facility 11 and separate from television distribution facility 15. Similarly, brand marks may be generated by a brand mark facility that is separate from main facility 11 and television distribution facility 15.

Regardless of its source, brand marks may be maintained on a server 16 within television distribution facility 15 if desired. Server 16 may be capable of handling text, images, graphics, video, any other suitable element, or a combination of these elements. In addition, server 16 may be capable of providing interactive services such as near video on demand (NVOD) and video on demand (VOD). Server 16 may be based on one or more computers.

Television distribution facility 15 may distribute program guide information and brand marks to user television equipment 18 or any other suitable user equipment of multiple users via communications paths 23. Program guide data may be distributed over an out-of-band channel on paths 23. Brand marks may be distributed using any of a number of suitable techniques. For example, text and graphics brand marks may be distributed over an out-of-band channel using an out-of-band modulator. Video brand marks may also be distributed in this way, although large quantities of video information may be more efficiently distributed using one or more digital channels on path 23. Such digital channels may also be used for distributing text and graphics.

Each component of user television equipment 18 may have a receiver such as set-top box 19 or any other suitable television or computer equipment into which circuitry similar to set-top box circuitry has been integrated. For clarity, the present invention is described primarily in connection with user equipment based on a set-top box arrangement. This is merely illustrative. The interactive television application may be implemented using user television equipment 18 that is based on a personal computer, a WebTV box, a personal computer television (PC/TV), or handheld computing device, etc. If desired, the interactive television application may be implemented using a client-server architecture using user television equipment 18 as a client processor and a server such as server 16.

Interactive television application data (e.g., program guide data, brand-mark data, and any other suitable data) may be distributed to set-top boxes 19 periodically (e.g., once per hour or once per week). Interactive television application data may also be distributed continuously or on-demand. A connection may be established to television distribution facility 15 using, for example, communication link 23. A request for certain interactive television application data may be sent from set-top box 19 to television distribution facility 15. Television distribution facility 15 may respond by sending the interactive television application data that was requested back to set-top box 19 using communications link 23. Main facility 11 may include a processor to handle information distribution tasks. Each set-top box 19 may contain a processor to handle tasks associated with implementing an interactive television application on set-top box 19. Television distribution facility 15 may include a processor for tasks associated with monitoring a user's interactions with the interactive television application implemented on set-top box 19 and for handling tasks associated with the distribution of program guide information and brand marks. An interactive television application of the present invention may be any suitable application such as an interactive television program guide. The interactive television application may have capabilities to implement the features described herein. If desired, the interactive television application may implement any other suitable features.

Each set-top box 19 may be coupled to an optional video recording device 20 (e.g., a videocassette recorder, personal video recorder), or any other type of recording device so that selected television programs may be recorded. Each video recording device 20 may be coupled to a display 21, which may be a computer monitor, a television, or any other suitable video output device. To record a program, set-top box 19 may tune to a particular channel and may send control signals to video recording device 20 (e.g., using an infrared transmitter) that may direct video recording device 20 to start and stop recording at the appropriate times.

During use of the interactive television application implemented on set-top box 19, television program listings and brand marks may be displayed on display 21. Set-top box 19, video recording device 20, and display 21 (if part of a television) may be controlled by one or more remote controls 22 or any other suitable user input interfaces such as a wireless keyboard, mouse, trackball, dedicated set of buttons, etc.

Communications paths 23 preferably have sufficient bandwidth to allow television distribution facility 15 to distribute scheduled television programming, pay programming, brand marks, and other video information to set-top boxes 19 in addition to non-video interactive television application data. Multiple television and audio channels (analog, digital, or both analog and digital) may be provided to set-top boxes 19 via communications paths 23. If desired, program guide information and brand marks may be distributed by one or more distribution facilities that are similar to, but separate, from television distribution facility 15 using communications paths that are separate from communications paths 23 (e.g., using Internet paths).

Certain functions such as pay program purchasing and the remote monitoring of certain users' interactions with the interactive television application may require set-top boxes 19 to transmit data to television distribution facility 15 over communications paths 23. If desired, such data may be transmitted over telephone lines or other separate communications paths. If functions such as these are provided using facilities separate from television distribution facility 15, some of the communications involving set-top boxes 19 may be made directly with the separate facilities.

A number of suitable techniques may be used to distribute brand marks (i.e., brand marks in video format) and video information. For example, if each path 23 includes a number of traditional analog television channels, one or more of these channels may be used to support a number of digital channels. The bandwidth of each analog channel that is used to support digital channels may support ten or more of such digital channels. If desired, brand marks may be provided from server 16 or other suitable equipment at television distribution facility 15 in a continuously-looped arrangement on these digital channels. This video information provided to set-top box 19 may then be used to determine which digital channels to tune to when it is time to display a desired brand mark. In an alternative embodiment, brand marks may be provided on demand. With this approach, set-top box 19 and server 16 may negotiate to determine a channel on which to provide the desired brand mark. Brand marks that originate from main facility 11 or a separate facility may be distributed to user television equipment 18 using these or other suitable techniques or a combination of such techniques.

Brand marks may be downloaded periodically (e.g., once per day) to set-top boxes 19 of FIG. 1 and stored locally. Brand marks may be accessed locally when needed by the interactive television application implemented on set-top box 19. In an alternate embodiment, brand marks may be provided in a continuously-looped arrangement on one or more digital channels on paths 23. With such a continuously-looped arrangement, a map indicating the location of the latest brand marks may be downloaded periodically to set-top boxes 19 (e.g., once per day). This allows the content on the digital channels to be updated. The interactive television application on set-top boxes 19 may use the map to locate desired brand marks on the digital channels.

Figure 2:
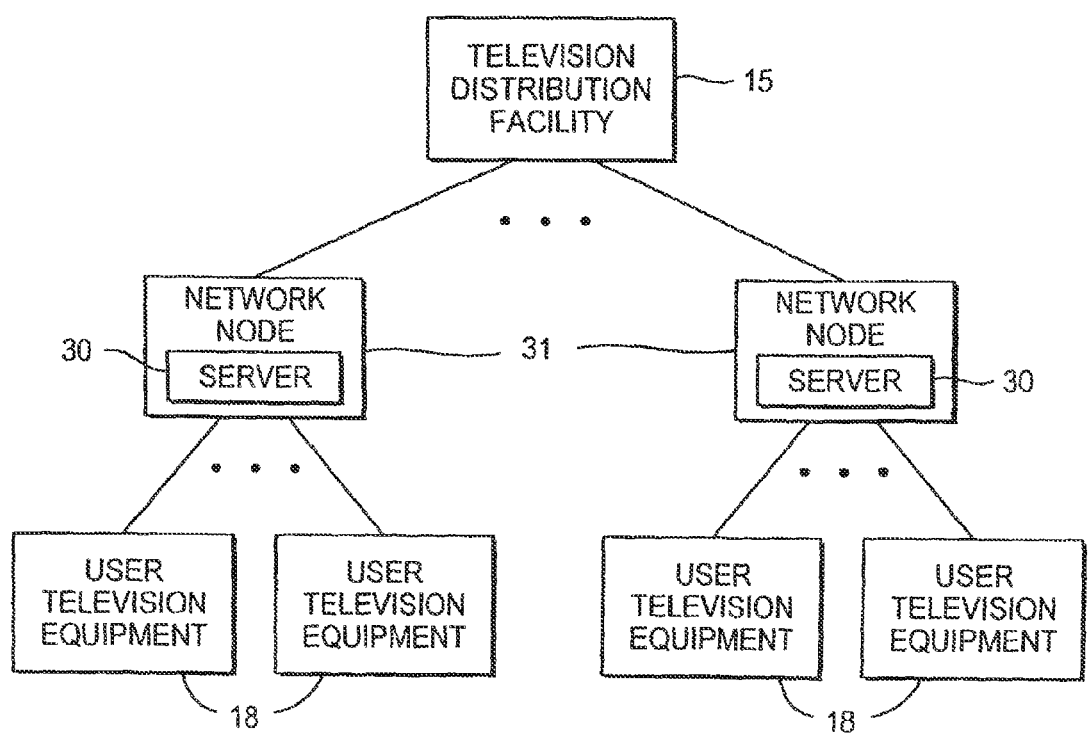
FIG. 2 is a block diagram of a system similar to the system of FIG. 1 showing how servers may be located at network nodes in accordance with the present invention.

As shown in FIG. 2, the capabilities of server 16 may be provided using servers 30 located at network nodes 31. Servers such as servers 30 may be used instead of server 16 or may be used in conjunction with a server 16 located at television distribution facility 15.

Another approach to download brand marks to set-top box 19 may involve using a server such as server 16 or servers 30. Servers may be used to provide the brand marks on request (e.g., after a set-top box 19 and that server have negotiated to set up a download operation). Brand marks may then be downloaded from the server to the set-top box. If desired, the server may provide instructions to the set-top box informing the set-top box where the desired brand marks can be located on a particular digital channel. The brand marks can be updated periodically if, for example, the server that is responsible for providing the instructions for informing the set-top box of the location of the brand marks is also updated periodically. This example is merely illustrative. If desired, brand marks may be updated by any suitable approach.

In one suitable approach, these processes may be used for brand marks that include images, graphics, or video information.

Text information for brand marks may be provided to set-top boxes 19 using the same paths that are used for distributing program guide data. For example, brand mark data from database 14 of FIG. 1 may be provided to set-top boxes 19 using link 12, television distribution facility 15, and paths 23. The text information may be stored locally in set-top boxes 19 and updated periodically (e.g., once per day). Text information may also be provided by server 16 using a continuously-looped arrangement or on request.

A cable modem may be used to distribute texts, graphics, and videos. Text information, graphics information, and video information for brand marks may be distributed using any suitable technique.

In one suitable embodiment of the present invention, the interactive television application may display a menu screen or any other suitable display screen on, for example, display 21 in response to a user command. The user command may take the form of, for example, pressing a "menu" key on remote control 22 (FIG. 1). A menu screen such as illustrative menu screen 400 of FIG. 3 may be generated and may provide the user with access to various interactive television application services. Menu screen 400 may include various selectable brand marks of television channels, program guides, program guide service providers, program guide operators, program guide programmers, television service providers, companies, digital music programmers, radio stations, websites, or any other suitable entity.

As shown in illustrative menu screen 400, the display screen may be divided into any number of selectable partitions or "cells." These cells may be used to display television content that is currently being broadcast, advertisements, brand marks, or any other suitable content. The cells may also be used to display non-specific and customer specific logos or any other suitable brand mark.

There may be any suitable number of cells in a menu screen. The cells may be any suitable size or shape and do not necessarily need to be the same size or shape as each other.

In one suitable embodiment of the interactive television application of the present invention, entities related to television channels, program guides, program guide service providers, program guide operators, program guide programmers, television service providers, companies, products, services, digital music programmers, radio stations, websites, customers, and any other suitable entity may be associated with any one or more particular cells. In one suitable approach, once an entity becomes associated with a particular cell, the entity may later become disassociated with that cell. Moreover, this entity may become re-associated with a cell, including the cell with which the entity was previously associated.

Figure 3:
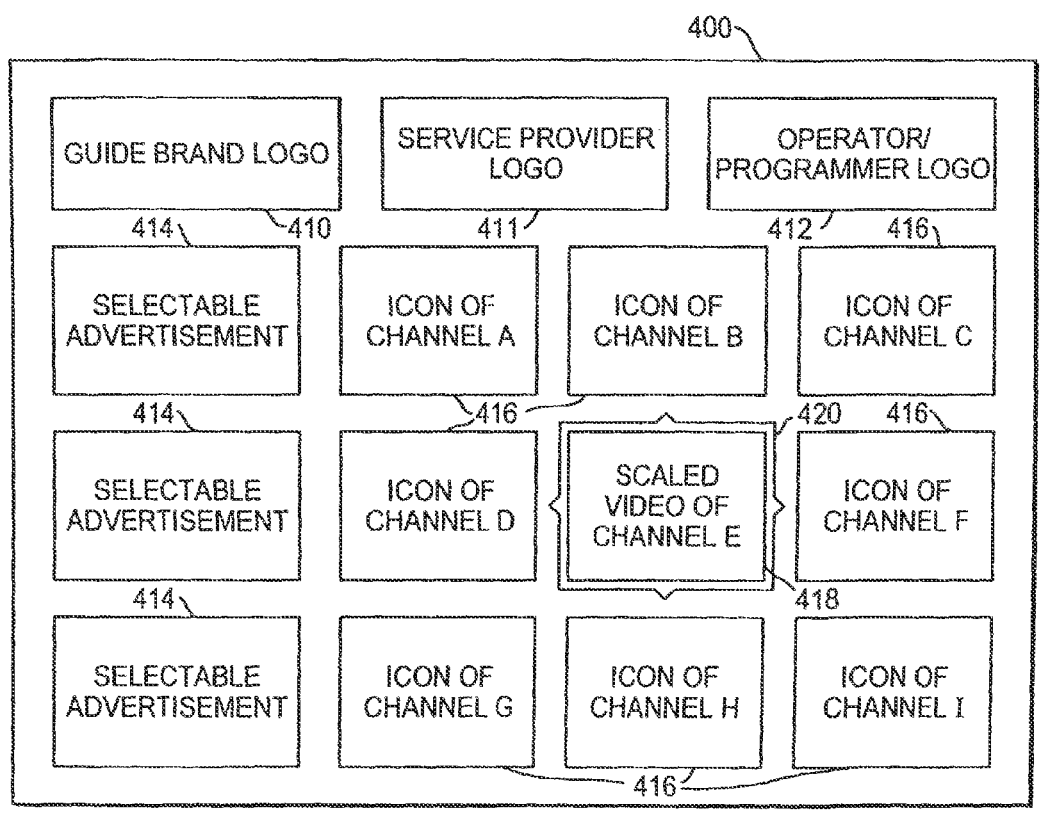
FIG. 3 shows an illustrative menu screen in which selectable cells are displayed in accordance with the principles of one embodiment of the present invention.

Cells may be organized or arranged in any suitable way. In FIG. 3, for example, the cells with which a program guide, a program guide service provider, and a program guide operator/programmer are associated (i.e., cells 410, 411, and 412, respectively) are lined up in a row along the top of the screen. Cells that display advertisement information (i.e., cells 414) are shown to be arranged in a column along the left side of menu screen 400. Cells with which a television channel is associated (i.e., cells 416 and 418) are shown to be positioned in the center. As shown with regard to cells 416 and 418, a plurality of cells may be arranged in a grid. This is merely an illustrative arrangement of cells in menu screen 400. Any other suitable arrangement of these or other cells may be used. For example, although FIG. 3 illustrates cells that are associated with similar entities to be adjacent to each other, cells that are associated with similar entities may be positioned in any other suitable arrangement. To make navigation easier, particular arrangements may be used. For example, in one suitable approach, television channel navigation may be made easier by arranging cells associated with television channels adjacent to one another. Any such suitable arrangement may be used.

In one suitable embodiment of the present invention, there may be one cell displayed in the menu screen that is the cell "in focus." It may also be made evident which cell is in focus. This may be accomplished by, for example, providing any suitable indicator around, or in close proximity to, the cell in focus. For example, as shown in FIG. 3, a highlight, such as highlight 420, may be displayed around the cell in focus (i.e., cell 418).

When a cell is not the cell in focus, that cell may display a brand mark of, for example, the television channel, program guide, program guide service provider, program guide operator, program guide programmer, television service provider, company, product, service, digital music programmer, advertisement, radio station, web-site, or any other suitable entity with which the cell is associated. These brand marks may be displayed in cells with which the corresponding entities are associated. In illustrative menu screen 400 of FIG. 3, for example, the cells associated with television channels that are not in focus (i.e., cells 416) may display corresponding brand marks of the television channel with which the cells are associated.

In one suitable approach, when a cell is in focus, content such as television content, links to web-sites, web-sites, or any other suitable content may be displayed within the cell. Other information such as information regarding the company, the digital music programmer, or any other suitable entity with which the cell in focus is associated may be displayed. In one suitable embodiment of the present invention, when a cell that is associated with a television channel is the cell in focus, the currently broadcasting television programming of the television channel with which the cell is associated may be displayed in the cell. The broadcast content may be scaled to fit within the boundaries of the cell. One suitable way in which television programs may be displayed in a cell is to have the interactive television application cause a tuner (e.g., a tuner at set-top box 19 of FIG. 1), to tune to a corresponding channel for that cell.

When a cell that is associated with a television channel is in focus and television programming is being displayed in the cell, brand marks of that particular television channel may be removed from the cell. In another suitable approach, brand marks may be displayed simultaneously in the cell with the television programming. These brand marks may be the same as, or, if desired, different from, the brand marks that were displayed when the cell is not in focus. The brand marks that are displayed simultaneously with the television programming may be reduced in size such that they are displayed in a portion of the cell. A brand mark that is displayed in a cell simultaneously with television programming may be transparent (e.g., a watermark). This may allow the television programming to be visible through the brand mark. Any other content such as the title of the program, the start time and length of the program, or a brief description of the program may also be displayed simultaneously with the current video, using for example, the transparency technique described above, or any other suitable technique such as an overlay.

Figure 4:
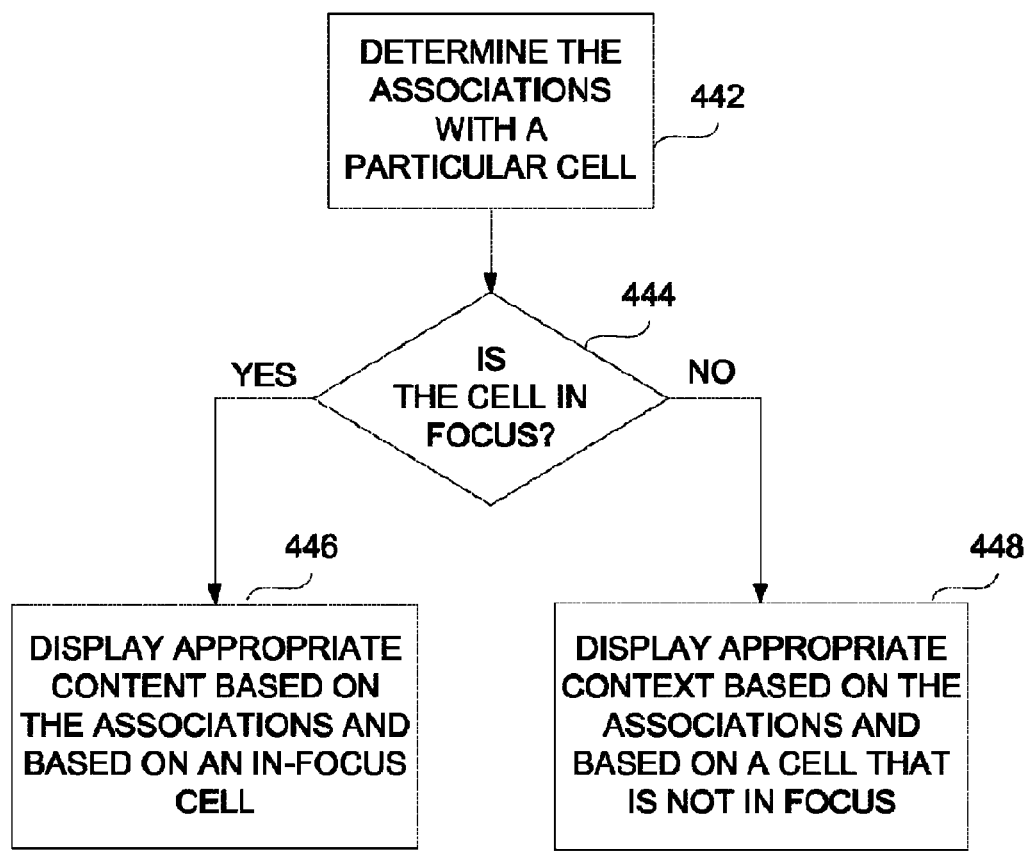
FIG. 4 is a flow chart of illustrative steps involved in the determination of information to be displayed in cells.

FIG. 4 shows a flow chart of illustrative steps for displaying information within cells on a menu screen. At step 442, the interactive television application may determine what type of entity is associated with a particular cell. For example, the interactive television application may determine if a cell is associated with a television channel, program guide, program guide service provider, program guide operator, program guide programmer, television service provider, company, product, service, digital music programmer, advertisement, radio station, web-site, or any other suitable entity. At step 444, the interactive television application may determine if the cell is in focus. Based on this determination, appropriate content may be displayed in a cell. If, for example, the interactive television application determines that the cell is in focus at step 444, the interactive television application may display the appropriate content based on the associations of the cell and based on the cell being in focus. This may occur at step 446. If the interactive television application determines that a cell is not in focus at step 444, the interactive television application may display the appropriate content based on the associations of the cell and based on the cell not being in focus. This may occur at step 448. This process is merely illustrative. Any other suitable approach may be used by the interactive television application to determine what information is to be displayed in each cell on a menu screen.

When a cell associated with an entity of a particular type is in focus, visible indications such as highlights or icons or any other suitable visible indications may be used to allow the user to be made aware of the association. When a cell is in focus, the indicator may, for example, be the same color or shape as the indicator of another cell associated with a similar entity if the other cell were to be in focus. For example, those cells that are currently associated with a sports related entity (e.g., a dedicated sports television channel or a television channel currently broadcasting a sporting event) may have a red highlight displayed around the cell when the cell is in focus. Meanwhile, cells that are associated with an entity related to movies such as a television channel that is currently broadcasting a movie, or is a dedicated movie channel, may have a highlight resembling a portrait frame displayed around the cell when the cell is in focus. This example is merely illustrative.

Figure 5A:
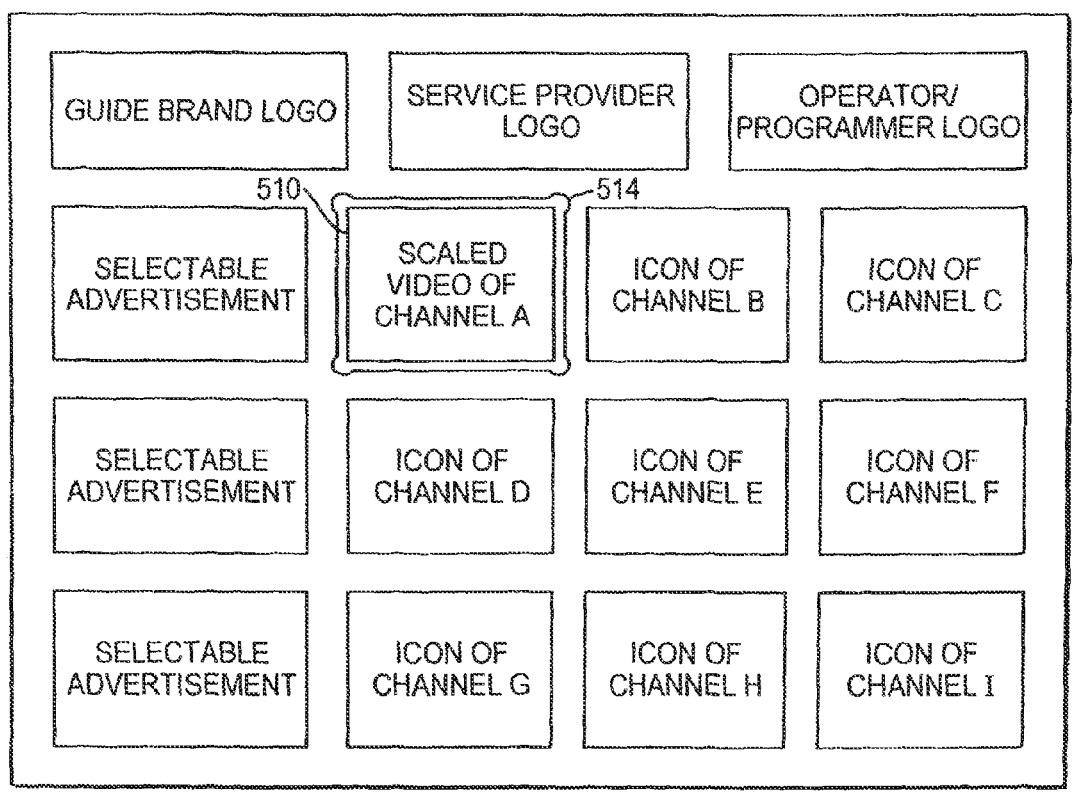
FIGS. 5A and 5B show illustrative menu screens with highlights displayed around cells in accordance with the principles of one embodiment of the present invention.
Figure 5B:
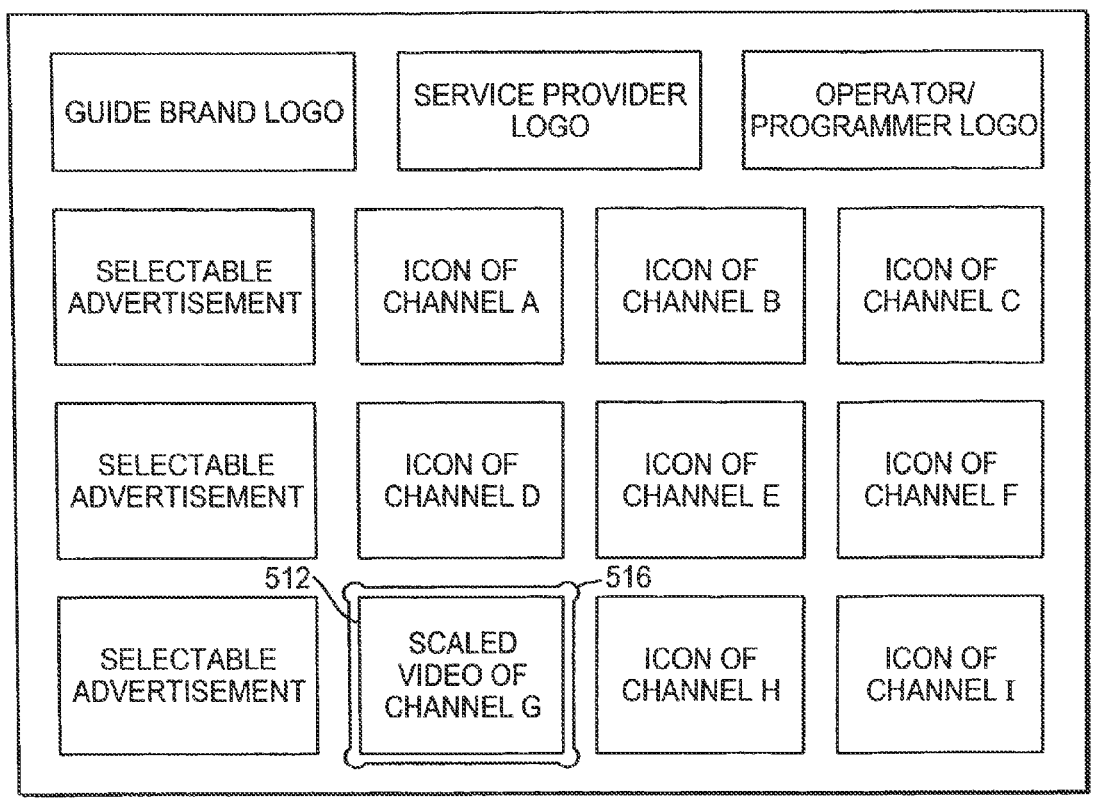

FIGS. 5A and 5B show an example of how cells that are associated with a similar entity may be highlighted or indicated in a similar manner when they are the cell in focus. Cell 510 of FIG. 5A is the cell in focus. A highlight such as highlight 514 may be displayed around cell 510. In FIG. 5B, cell 512 is the cell in focus. For the purposes of this example, cells 510 and 512 are associated with similar entities (e.g., a television channel currently broadcasting a movie or a dedicated movie channel). A highlight such as highlight 516 may be displayed around cell 512. Highlight 514 and highlight 516 may be substantially similar. This example is merely illustrative. Any suitable approach to indicate to the user that cells may display content associated with similar entities may be used.

If the focus were to move from one cell to another, the appropriate highlight may be displayed around the cell to which the focus moved. If, for example, the entity associated with the cell in focus was a movie station, and the user commanded the interactive television application to move the focus to a cell associated with sports programming, the highlight may change accordingly.

The interactive television application may allow the user to change which cell is in focus by, for example, pressing the appropriate keys (e.g., up, down, left, right) on remote control 22.

In one suitable approach, when the user is navigating through a menu screen that is currently displaying cells associated with television channels, the interactive television application may allow the user to display content associated with a particular television channel on a menu screen by, for example, pressing the appropriate keys on remote control 22 (e.g., the number keys, a jump key, or last channel key). The cell that displays the content associated with the television channel that the interactive television application was commanded to display may be the cell in focus or any other suitable cell.

If a particular cell was the cell in focus, and another cell became the cell in focus (e.g., the interactive television application allowed the user to have another cell become the cell in focus), scaled video, links to web-sites, or any other suitable content regarding the entity with which the cell is associated may no longer be displayed in the cell.

When a cell becomes in focus, content corresponding to the entity with which the cell is associated that was previously not displayed (i.e., because the cell was not in focus) may be displayed in the cell.

Figure 6A:
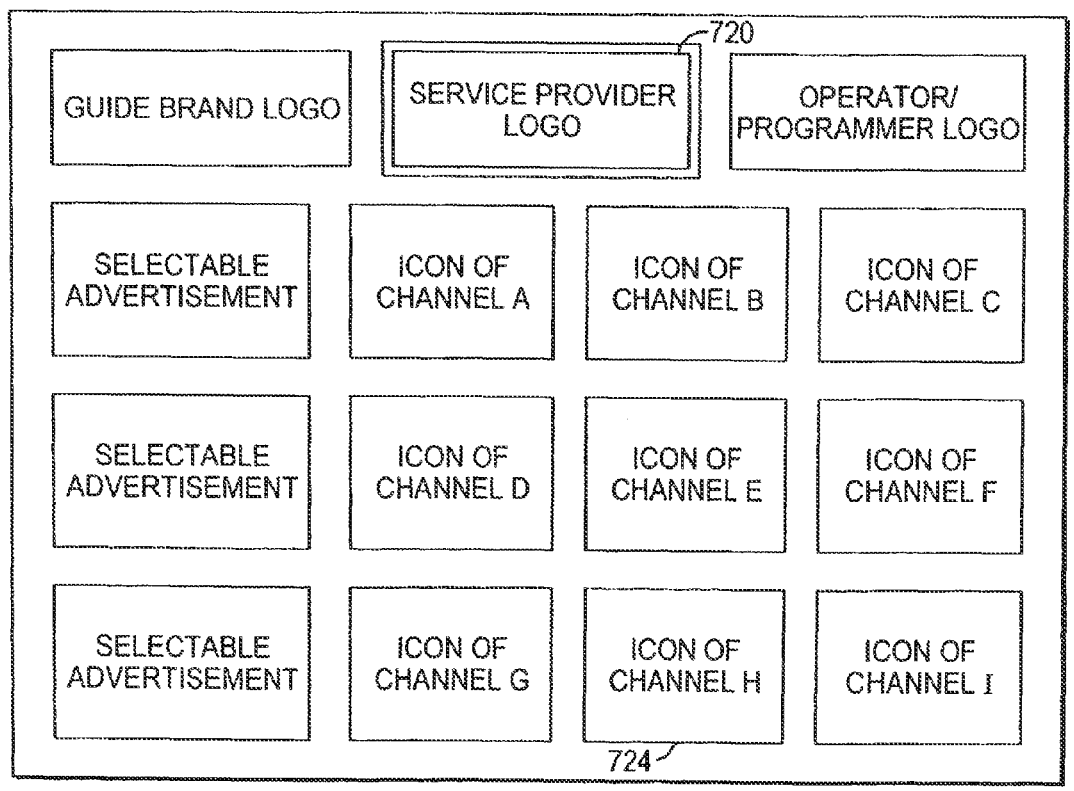
FIGS. 6A and 6B show illustrative menu screens in which the focus may "jump" or "wrap around" to any suitable selectable cell in accordance with the principles of one embodiment of the present invention.
Figure 6B:
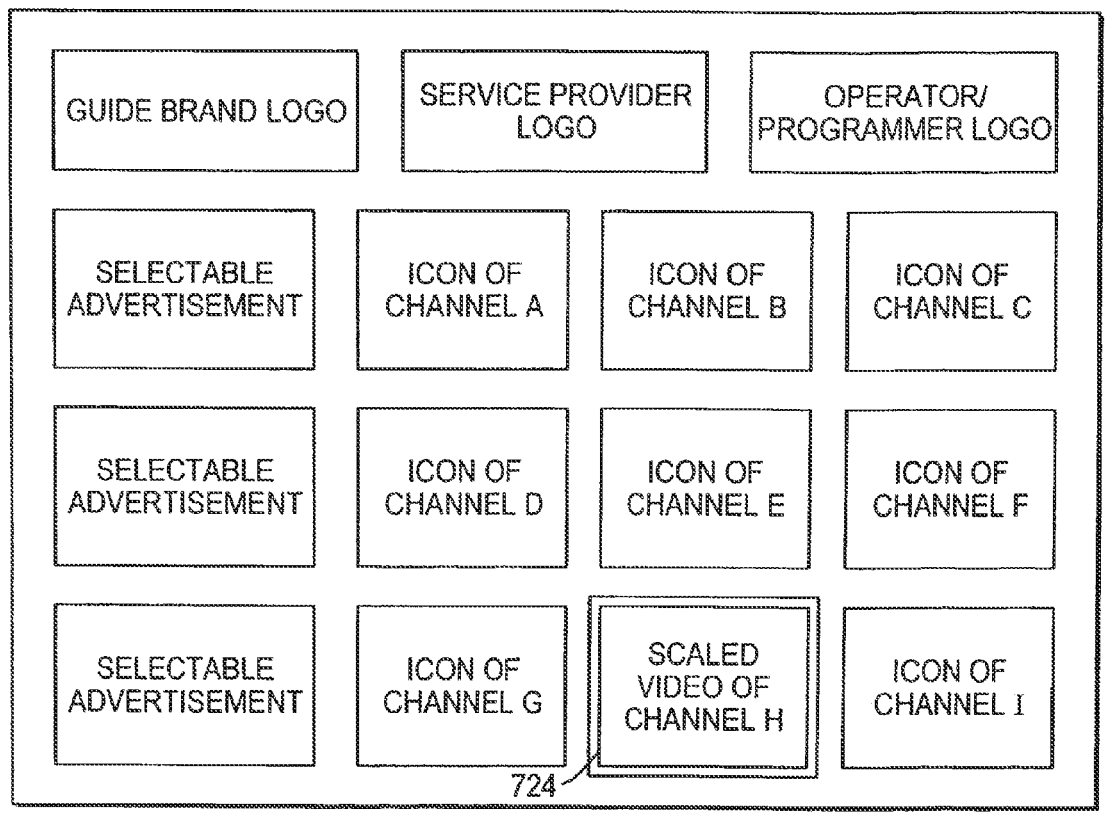

In one suitable embodiment, if there are no cells in a particular direction in relation to the cell in focus, and the user commanded the interactive television application to move the focus in that particular direction, the focus may "jump" or "wrap around" to a selectable cell on the opposite side of the menu screen or to any other suitable cell. As shown in FIGS. 6A and 6B, for example, if there are no selectable cells above the cell in focus, and the user pressed the up arrow key on remote control 22, for example, a cell at the bottom of the menu screen may become the cell in focus.

In FIG. 6A, cell 720, the cell associated with a service provider of the interactive television application, is in focus. FIG. 6B shows that if the user pressed the up arrow key on remote control 22, for example, the focus may "jump" or "wrap around" to cell 724 on the bottom of the menu screen.

Another feature of the present invention may allow for the interactive television application to group cells together as "regions." A region may be any suitable collection and arrangement of cells. For example, a region may include a cluster (i.e., group) of cells that may be associated with a particular type of entity (e.g., television channels). The cluster of cells may be arranged in a grid. Regions may include one or more cells.

Grouping cells into regions may facilitate and aid navigation through menu screens. By grouping cells into regions, it may be easier to determine which cells are associated with which type of entity than if cells were not grouped into regions. Cells associated with similar entities may be grouped together as a region although all of those cells need not be adjacent to each other.

The interactive television application of the present invention may give users the ability to navigate between different regions. For example, when a user navigates among the cells of a region individually, the user may press a "region" key on remote control 22 to begin navigating between regions. The user may navigate between regions by issuing any suitable command (e.g., by pressing the arrow keys on remote control 22).

Figure 7A:
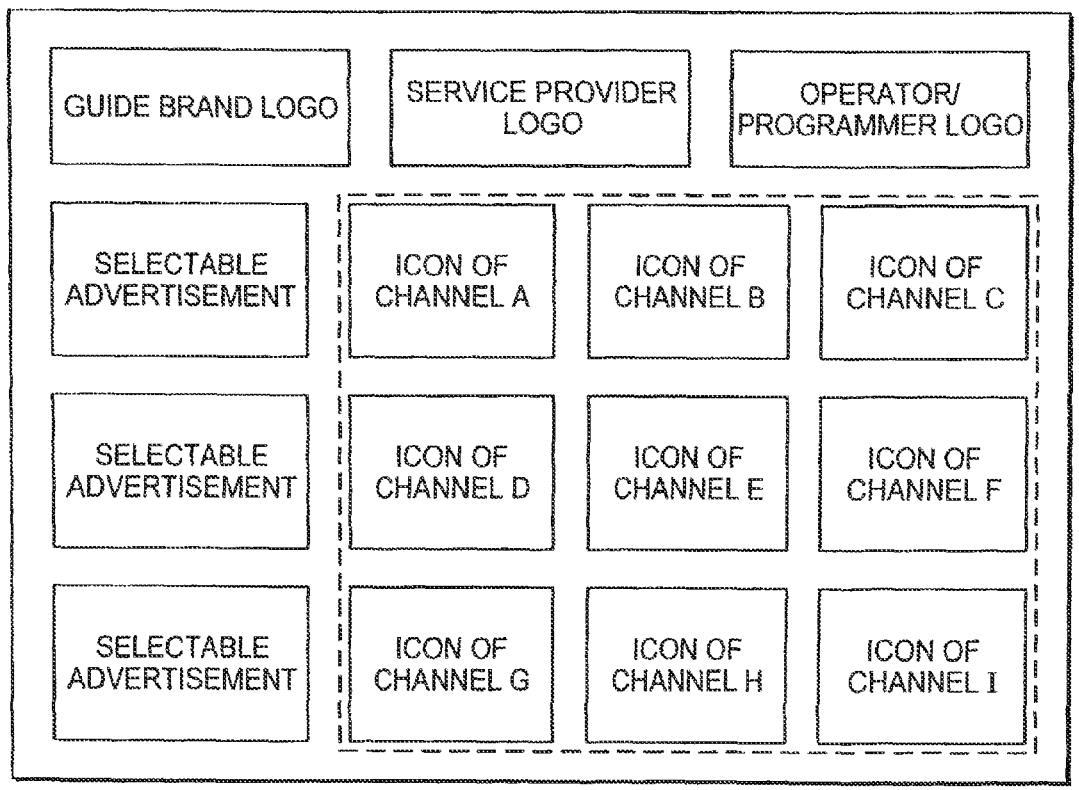
FIGS. 7A, 7B, and 7C show illustrative menu screens in which cells may be grouped together in regions in accordance with the principles of one embodiment of the present invention.
Figure 7B:
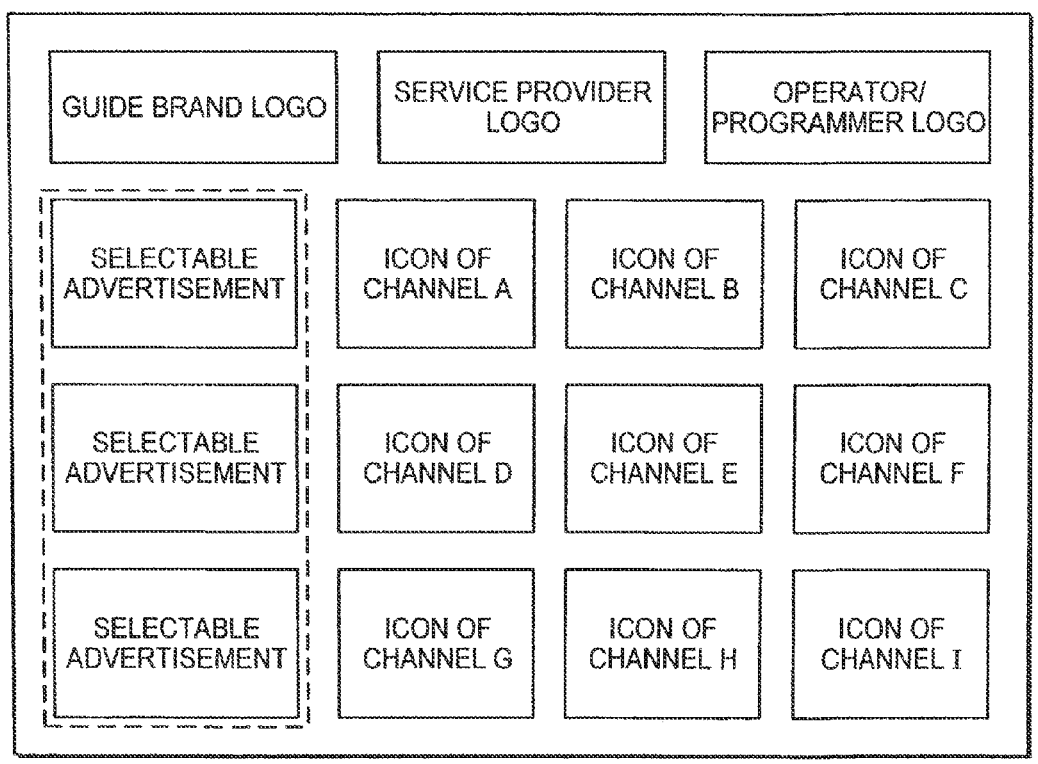
Figure 7C:
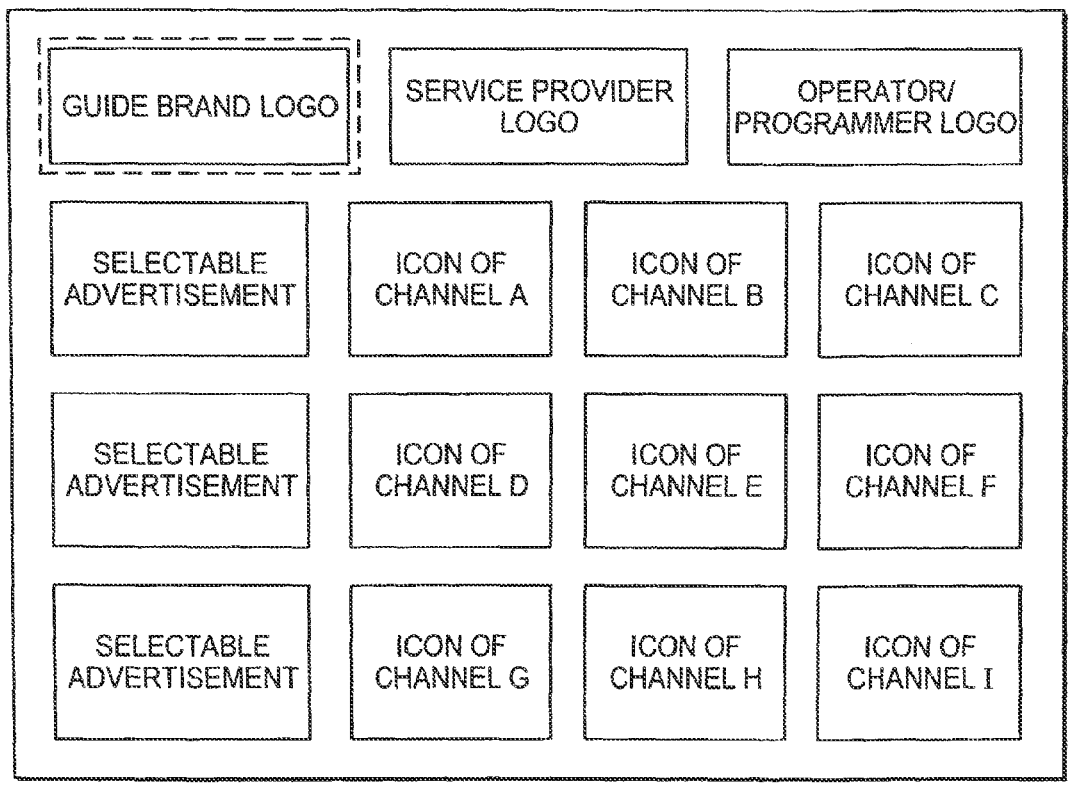

FIGS. 7A, 7B, and 7C show several cells grouped together as regions. The dashed line in exemplary FIGS. 7A, 7B, and 7C indicates which cells are grouped together as a region. As shown in FIG. 7A, for example, cells associated with television channels may be grouped together as a region. In FIG. 7B, for example, cells associated with selectable advertisements may be grouped together as a region. In FIG. 7C, for example, a cell associated with a guide brand may be a region. These examples are merely illustrative. Any suitable grouping of a cell or cells into a region may be used. The grouping of a cell or cells into regions may change appropriately if the association between a cell and an entity changes.

Figure 7D:
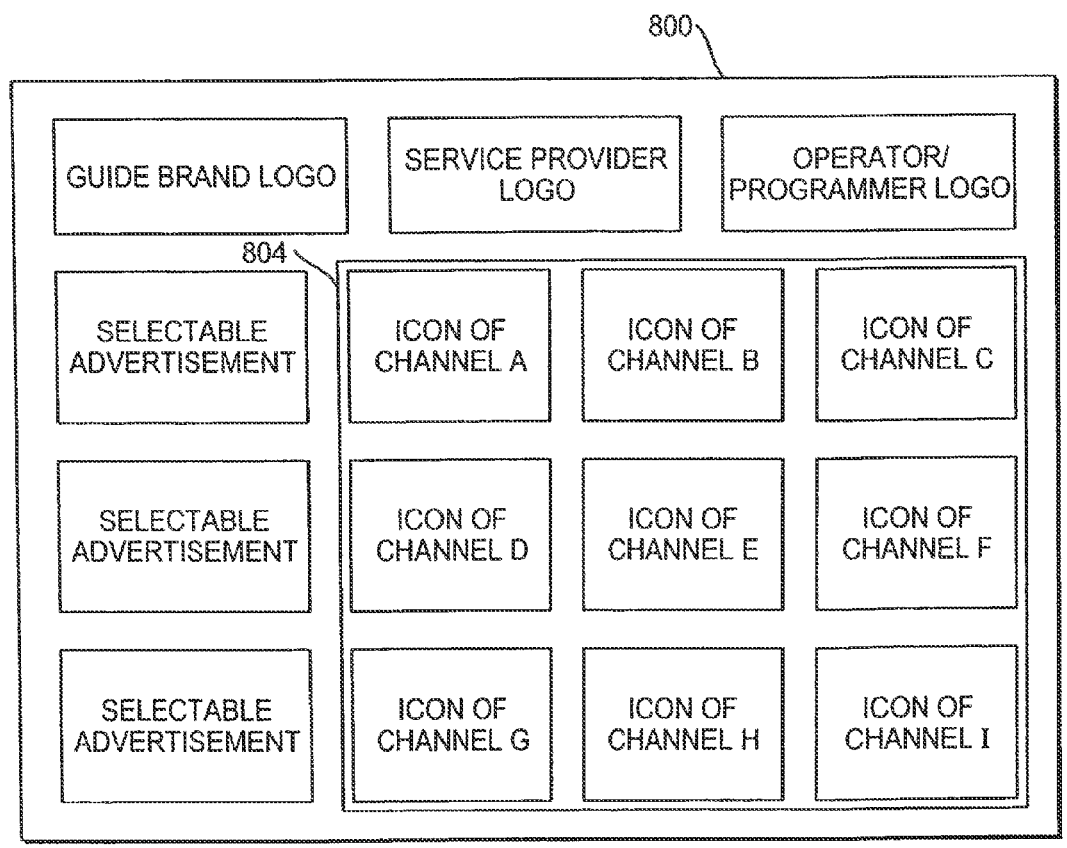
FIGS. 7D and 7E show illustrative menu screens in which highlights may be displayed around a region or regions in accordance with the principles of one embodiment of the present invention.

When a user is navigating among regions, a highlight or some other indicator may be displayed around, or in close proximity to, the cells of the particular region to which the user has navigated to indicate to the user which cells correspond to that particular region. Highlight 804, for example, is drawn around a region of cells in illustrative menu screen 800 of FIG. 7D.

In one suitable embodiment, all regions displayed in a menu screen may be bound by indicators (e.g., highlight) that may identify the cells that make up a particular region. The indicators may change in any suitable way when the user navigates to the corresponding region. For example, a red highlight may be drawn around the currently displayed cells that correspond to television channels. When the user navigates to this region, the red highlight may turn yellow or become twice as wide as it was previously.

Figure 7E:
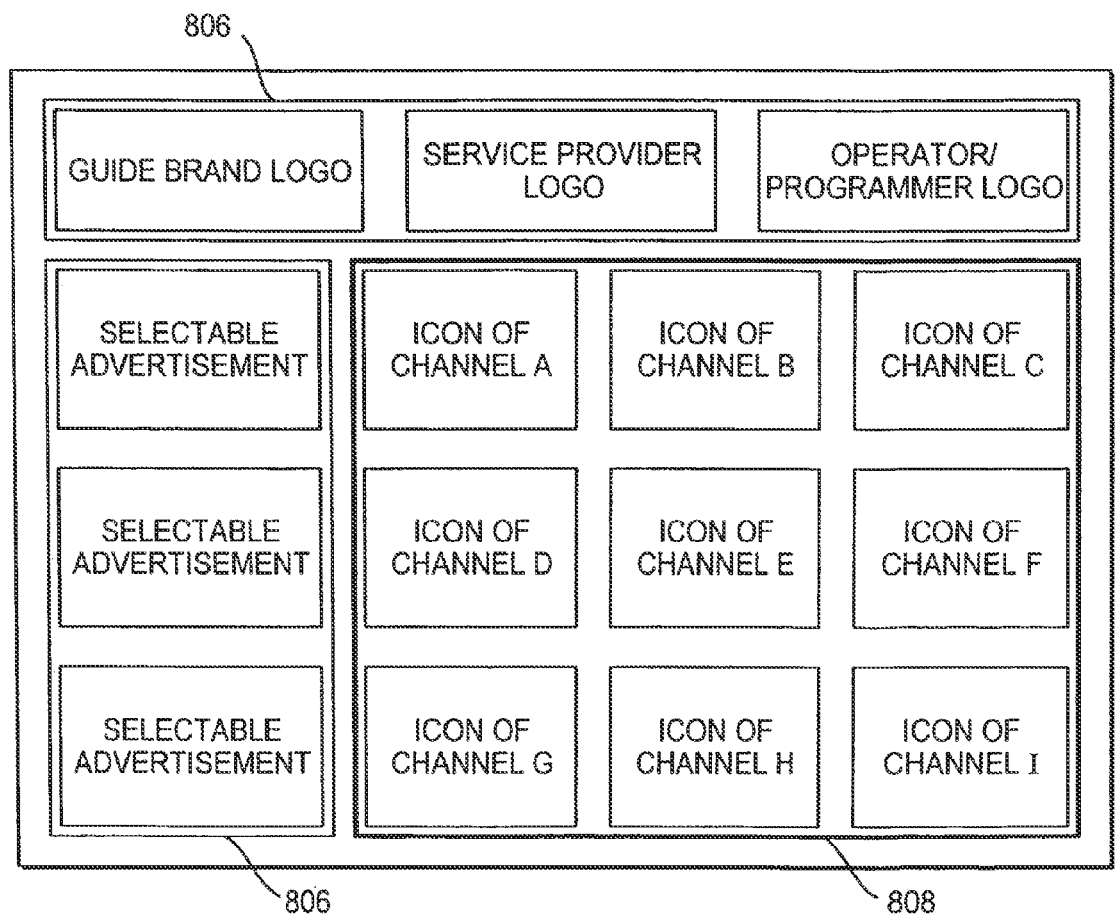

In illustrative menu screen 802 of FIG. 7E, for example, a group highlight, such as group highlight 806, may be displayed around the cells of regions to which the user has not navigated. A navigation highlight, such as navigation highlight 808, may be displayed around the cells of the region to which the user has navigated. In this embodiment, a navigation highlight, such as navigation highlight 808, may be displayed around a region to indicate to the user to which region the user has navigated. Group highlight 806 may be displayed around a region when the user has not navigated to that region. This example is merely illustrative. Any suitable approach to indicate to the user to which region the user has navigated may be used.

When a user navigates among regions, there may or may not be a cell in focus. For example, the cell in the middle of the region, or some other pre-determined cell in that region, to which the user has navigated may be the cell in focus. An example of a pre-determined cell may be the cell that was the last cell to be in focus when the user was navigating through the individual cells of that region (if the cells of that region had previously been navigated through individually). In an alternative embodiment, the cell in focus may be the cell closest to the cell that was previously in focus (i.e., the cell that was previously in focus in the region from which the user had just navigated).

Figure 8:
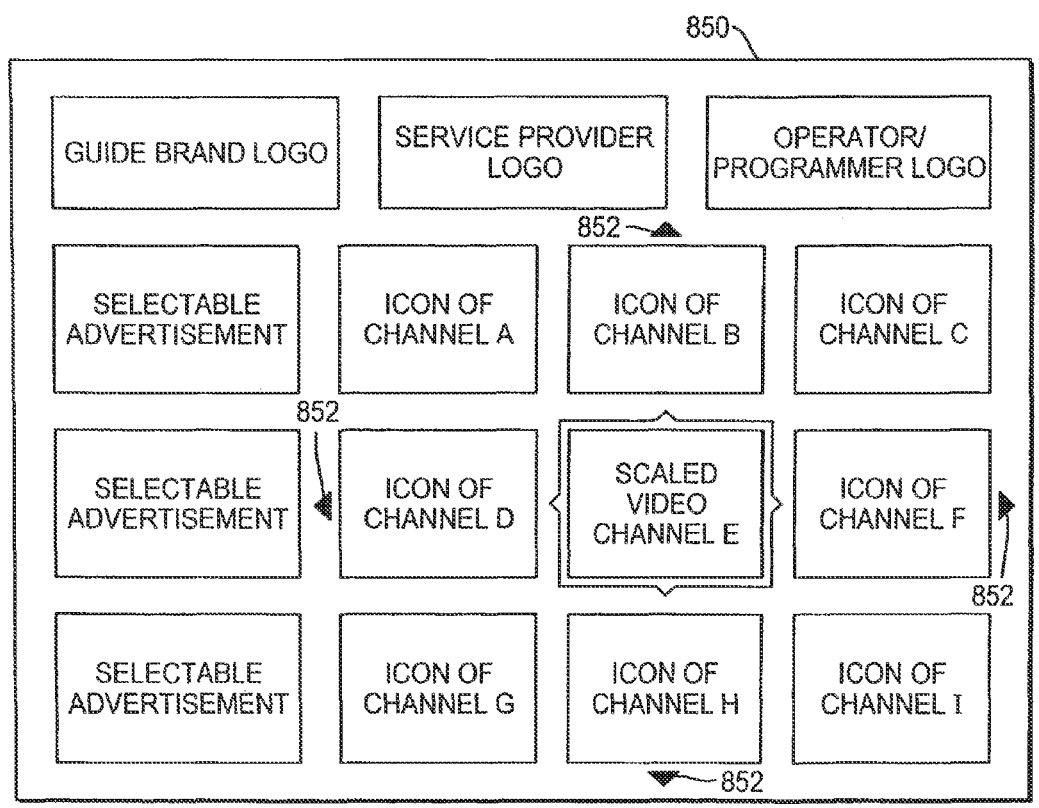
FIG. 8 shows an illustrative menu screen in which indicators may be used to indicate to the user that there are entities currently not associated with cells in accordance with the principles of one embodiment of the present invention.

In embodiments in which the user may be able to navigate among regions, there may be indicators such as indicators 852 shown in illustrative menu screen 850 of FIG. 8. Indicators 852 may be used to indicate to the user that there may be more entities currently not associated with cells displayed in menu screen 850. Indicators 852 may indicate that it is possible for the interactive television application to have these entities become associated with cells on a menu screen. Indicators 852 may be in the shape of arrows to indicate to the user that if the user navigated in the direction of those particular arrows, these entities may become associated with cells in a menu screen. Indicators 852 may be displayed when navigating among regions and when navigating among the cells of a region individually. Indicators 852 may be incorporated into a highlight or any other indicator. There may be any suitable number of indicators, such as indicators 852, on a menu screen at any given time.

In some embodiments that use indicators, such as indicators 852, if there are no more entities for which information is to be displayed in a particular direction (e.g., at the beginning or end of a list), the indicator or indicators for that particular direction or directions may not be displayed. In an alternative embodiment, these indicators may still be displayed on the menu screen but displayed differently than other indicators to designate that there are no more entities for which information is to be displayed in that particular direction.

When a user navigates to a region in which there is a cell that the user desires to be in focus, the interactive television application may allow the user to cease the navigation of regions and begin navigating through the individual cells of a region by, for example, pressing the "region" key on remote control 22.

Figure 9A:
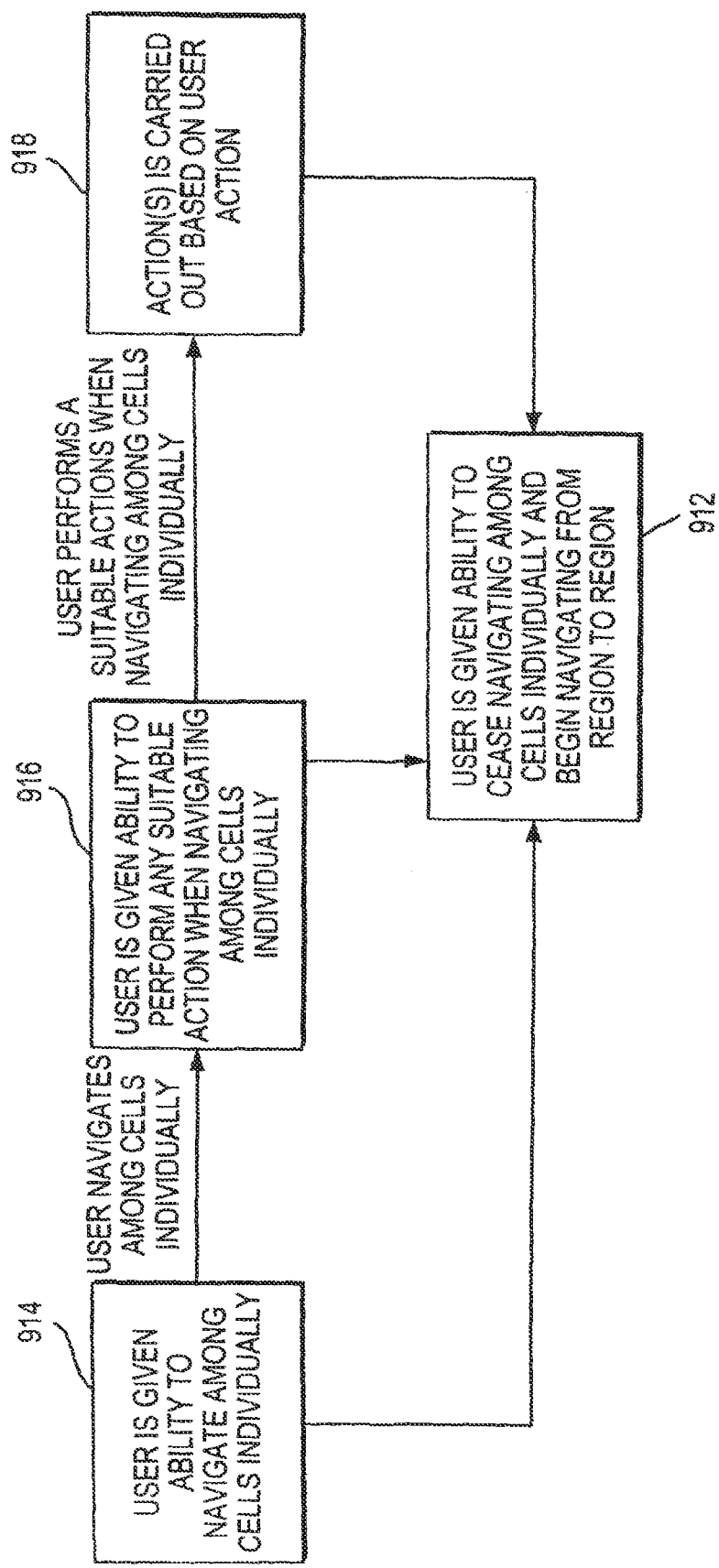
FIGS. 9A and 9B are flow charts of illustrative steps involved in navigating among cells individually and navigating among regions in accordance with the principles of one embodiment of the present invention.
Figure 9B:
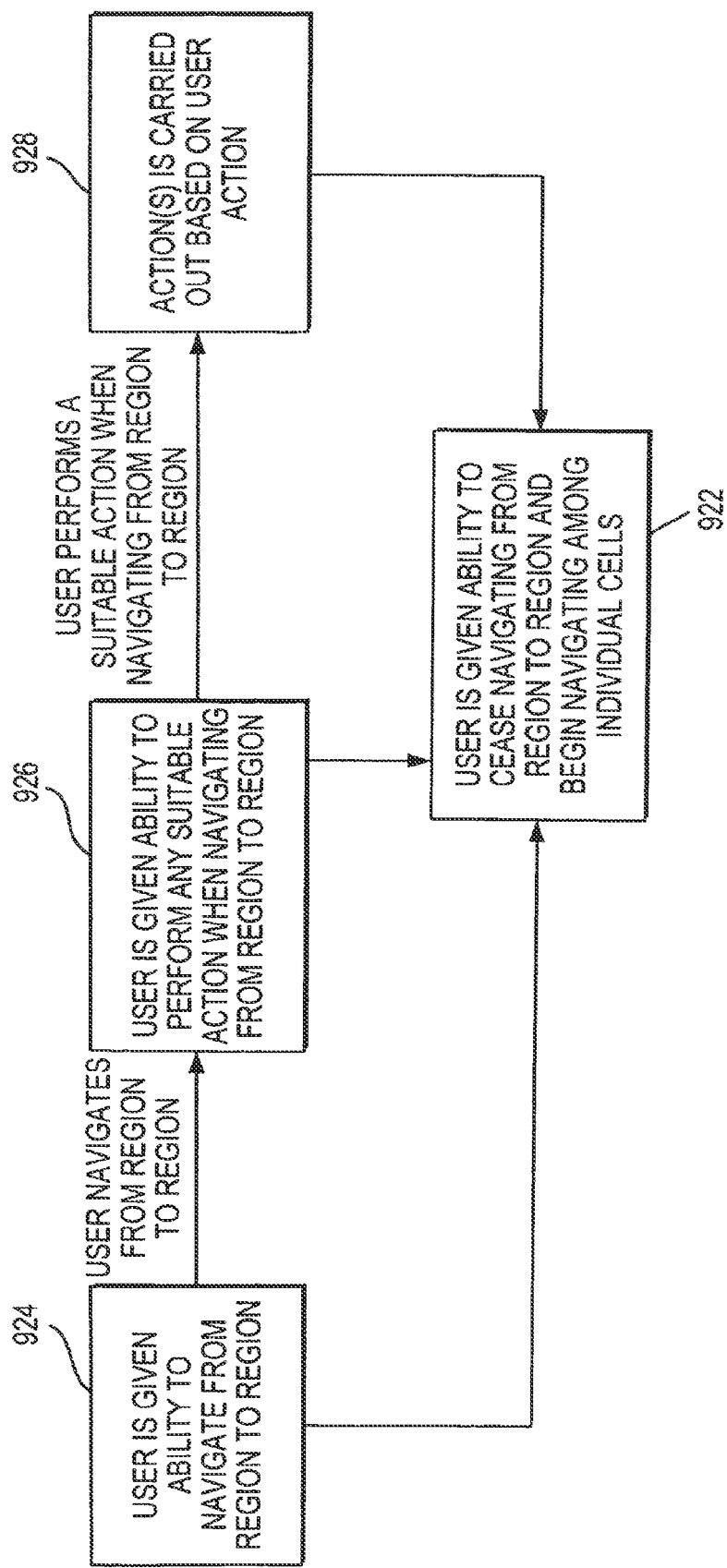

FIG. 9A is a flow chart of illustrative steps for navigating to any cell displayed on a menu screen if the user were navigating among cells individually. FIG. 9B is flow chart of illustrative steps for navigating to any region displayed on a menu screen if the user were navigating among regions. By way of these steps, any cell on a menu screen may be navigated to.

As shown in FIG. 9A, at any time that the user is navigating among cells individually, the user may be given the ability to cease navigating among cells individually and begin navigating among regions. This may occur at step 912. At step 914, the user may be given the ability to navigate among cells individually. Once the user navigates to a desired cell, the user may be given the ability to perform any suitable action when navigating among cells individually. This may occur at step 916. Once the user performs a suitable action when navigating among cell individually, that action may be carried out at step 918.

As shown in FIG. 9B, at any time that the user is navigating among regions, the user may be given the ability to cease navigating among regions and begin navigating among individual cells. This may occur at step 922. At step 924, the user may be given the ability to navigate among regions. Once the user has navigated to a desired region, the user may be given the ability to perform any suitable action when navigating among regions. This may occur at step 926. Once the user performs a suitable action when navigating among regions, that action may be carried out at step 928.

In one suitable approach, a particular cell may automatically be in focus (i.e., have a highlight displayed around, or in close proximity to that cell) when the user begins to navigate through the cells of a region individually. In another suitable approach, an arbitrary cell (e.g., a random cell) may automatically be in focus when the user begins to navigate through the cells of a region individually. The cell that is automatically the cell in focus may, for example, be a cell that is in the center, or close to the middle, of the region. In an alternative embodiment, if the user was navigating through the cells of a region individually prior to navigating among regions, the last cell to have been in focus (when navigating among the cells of that region individually) may be the cell that is automatically in focus. The flow charts of FIGS. 9A and 9B are merely illustrative.

In approaches such as those described above, a particular television channel, program guide, program guide service provider, program guide operator, program guide programmer, television service provider, product, service, company, digital music programmer, radio station, web-site, or any other suitable entity may always be associated with a particular cell. In an alternative embodiment, the cells to which these entities are associated may change. That is, these entities may be able to become disassociated with a cell and become re-associated with another cell. Entities may also become re-associated with a cell with which the entity was associated sometime in the past. Information corresponding to an entity that was previously not displayed on a menu screen (i.e., information corresponding to an entity that was not associated with a cell) may be displayed on a menu screen if the entity with which the information corresponds becomes associated with a cell.

FIGS. 10A and 10B illustrate how entities may become associated or disassociated with a cell. FIG. 10A illustrates how an entity may become disassociated with a cell and then become associated with another cell. FIG. 10B also illustrates how an entity may become disassociated with a cell. FIG. 10B further illustrates how another entity (i.e., an entity other than the entity that was originally associated with the cell) may become associated with the cell from which the original entity became disassociated.

At step 622 of FIG. 10A, the user may be given the ability to change the association between an entity and a cell. At step 624, the association between the cell and the entity may change, based on, for example, a user command. At step 626, the entity that was disassociated from the cell may become associated with another cell.

At step 662 of FIG. 10B, the user may be given the ability to change the association between an entity and a cell. At step 664, the association between the cell and the entity may change, based on, for example, a user command At step 666, an entity (including the entity that was originally associated with the cell) may then become associated with that cell.

These flow charts are merely illustrative. Any suitable way or combination of ways for entities to become associated or disassociated with cells may be used.

Any suitable approach for allowing entities to become associated or disassociated with cells may be used when navigating among cells individually or navigating among regions.

Figure 11A:
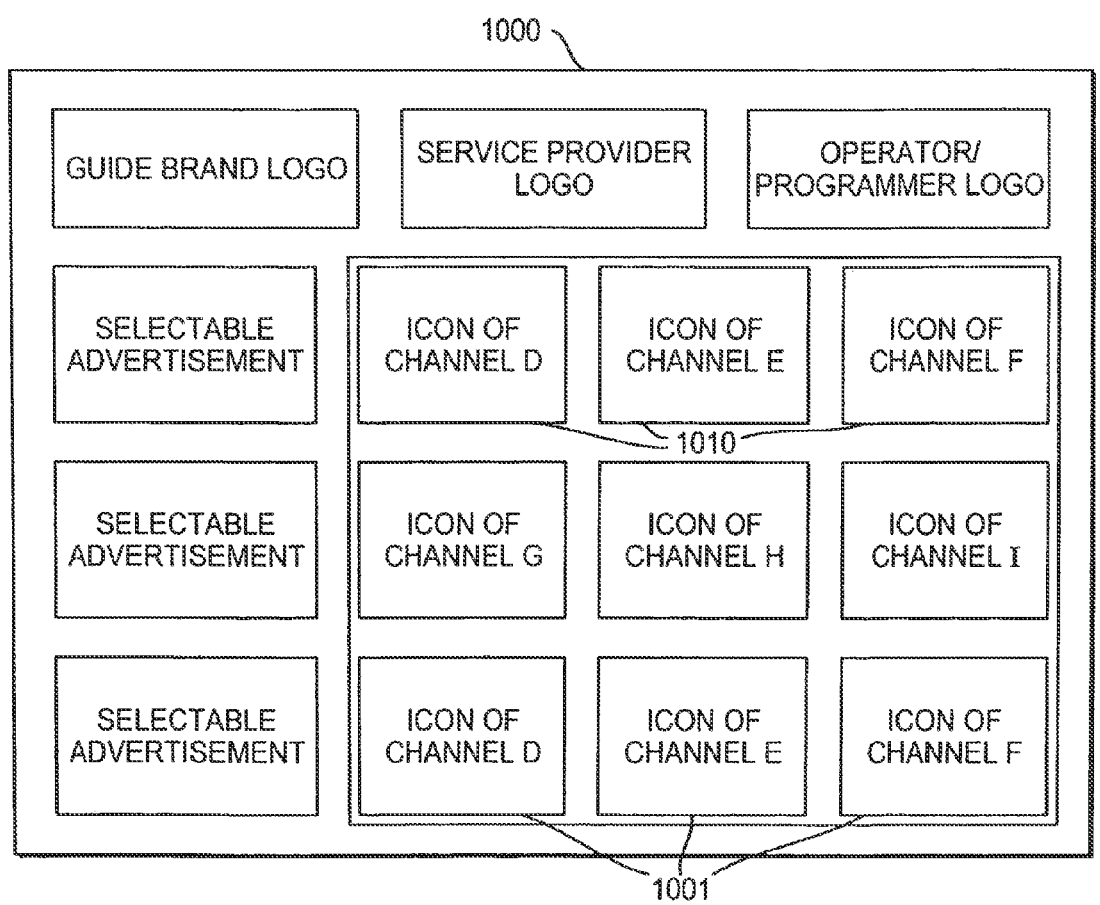
FIGS. 11A, 11B, and 11C show illustrative menu screens in which associations between cells and entities may change in accordance with the principles of one embodiment of the present invention.

In one suitable embodiment, information that corresponds to entities for which there are no associated cells in the menu screen may be displayed by the re-association process described above. For example, with regard to menu screen 800 of FIG. 7D, a menu screen such as menu screen 1000 of FIG. 11A may be displayed if, for example, the user pressed the down key on remote control 22. In this illustration, for example, television channels J, K, and L are now associated with the bottom row of cells (i.e., cells 1001. Thus, information associated with television channels J, K, and L may be displayed in the bottom row of cells (i.e., cells 1001). FIG. 11A also illustrates that television channels A, B, and C as no longer being associated with the top row of cells (i.e., cells 1010) in illustrative menu screen 1000 of FIG. 11A. Thus, information associated with television channels A, B, and C may no longer displayed on menu screen 1000.

Figure 11B:
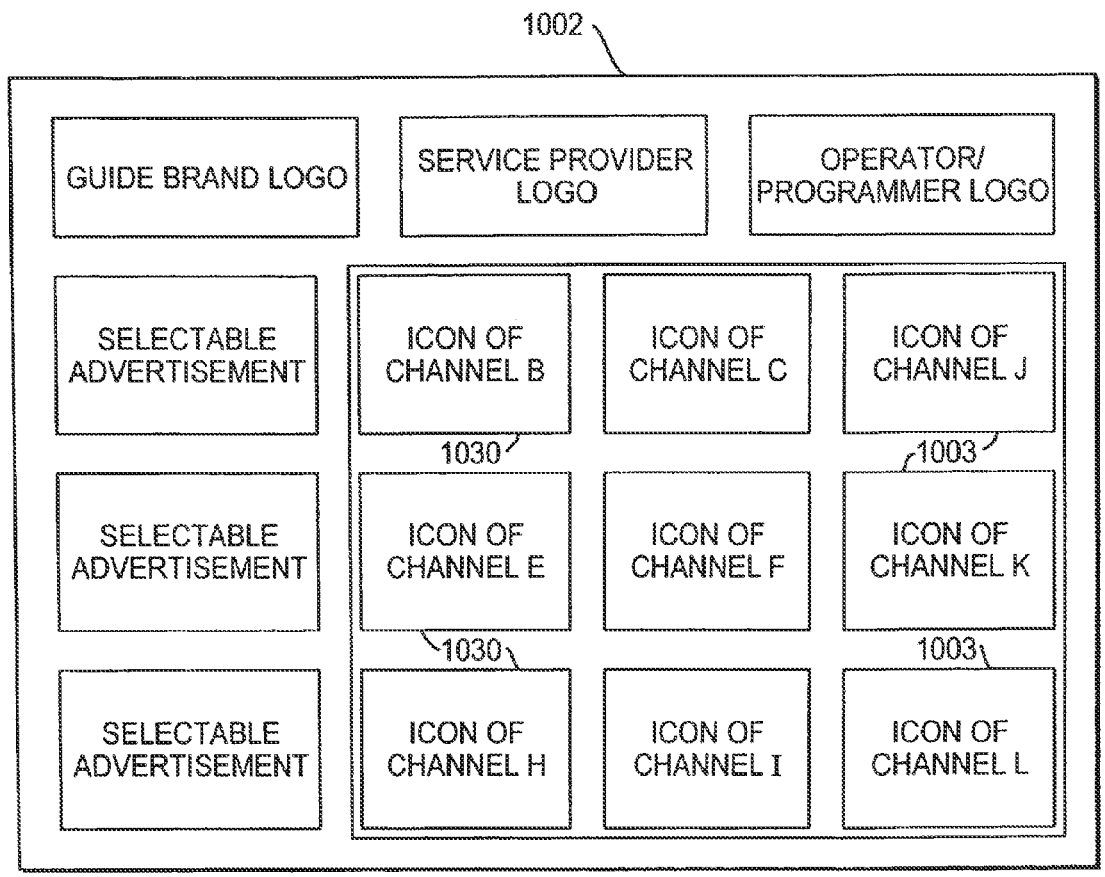

If, for example, the user pressed the right arrow on remote control 22 with illustrative menu screen 800 having been displayed, then illustrative screen 1002 of FIG. 11B may be displayed. As shown in FIG. 11B, television channels J, K, and L may become associated with the right-hand column of cells (i.e., cells 1003). Thus, information associated with television channels J, K, and L may be displayed in these cells (i.e., cells 1003). FIG. 11B also illustrates that television channels A, D, and G as no longer being associated with the left-hand column of cells (i.e., cells 1030) in illustrative menu screen 1002 of 10B. Thus, information associated with television channels A, D, and G may no longer displayed on menu screen 1002. These examples are merely illustrative. Entities may become associated and disassociated with cells in any suitable way.

In another suitable embodiment, a collection of cells (e.g., a region) may become associated with a corresponding collection of entities. This action may be referred to as "paging." To command the interactive television application to page, the user may, for example, press a page button on remote control 22. When the interactive television application is commanded to page, all of the entities associated with cells of the particular region to which the user has navigated may become disassociated with these cells. Entities that were previously not associated with these cells may then become associated with these cells.

Figure 11C:
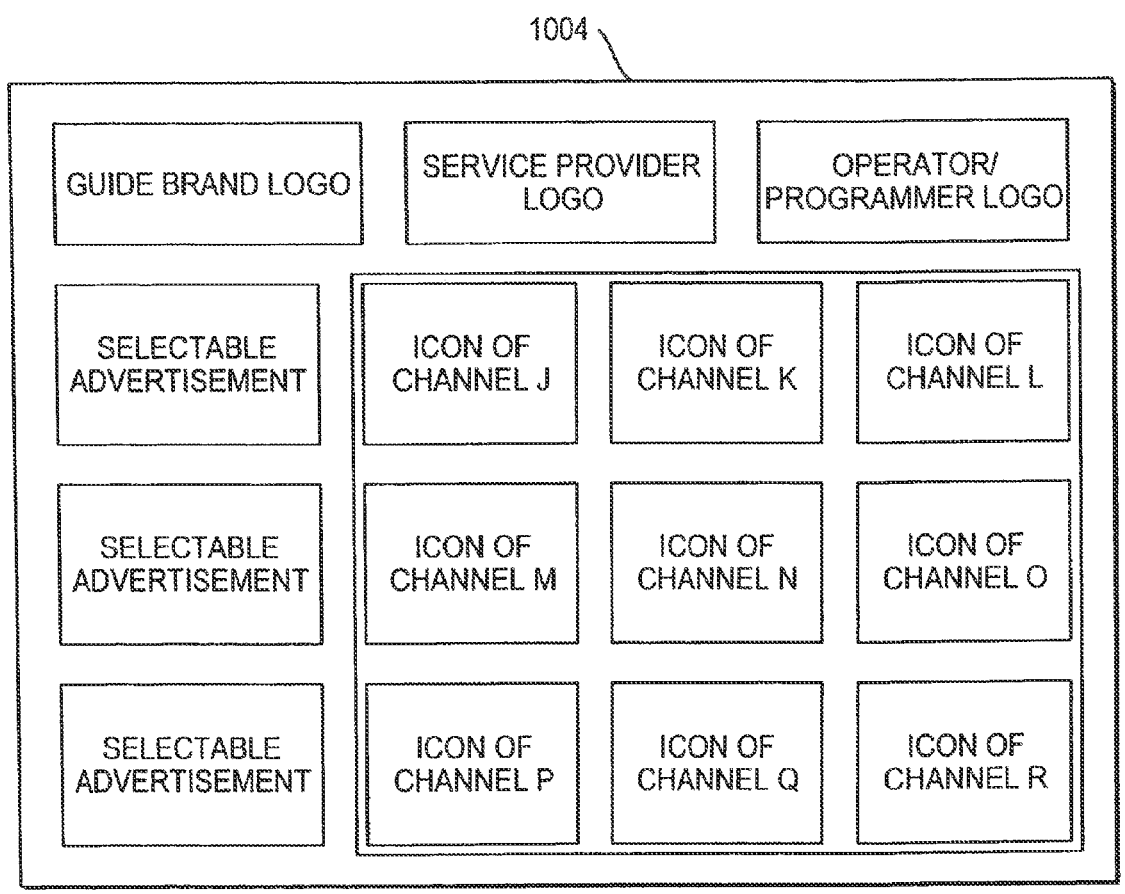

If, for example, illustrative menu screen 800 were displayed, and the user pressed the "page" button on remote control 22, illustrative menu screen 1004 of FIG. 11C may be displayed. As shown in FIG. 11C, television channels A-I may become disassociated with the cells of the region corresponding to television channels and television channels J-R may, for example, become associated with the cells of this region.

If the user commanded the interactive television application to "page," and there were more cells in a particular region than there were entities that could become associated with these cells, all of the cells of a region may not be displayed. For example, if only television channels A-N can become associated with cells, and the "page" button was pressed when illustrative menu screen 800 was displayed, a menu screen such as illustrative menu screen 1100 of FIG. 12A may be displayed.

Figure 12A:
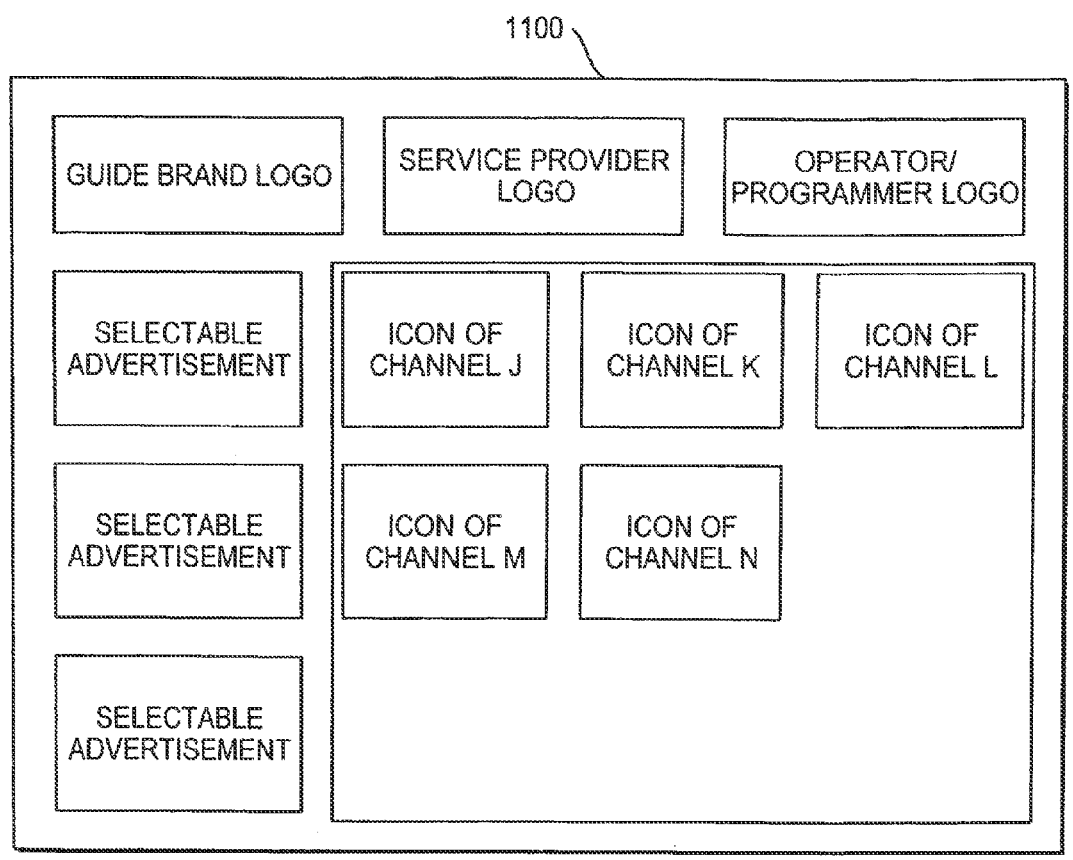
FIGS. 12A, 12B and 12C show illustrative menu screens in which associations between cells and entities may change when the "page" button is pressed in accordance with the principles of one embodiment of the present invention.

As shown in menu screen 1100 of FIG. 12A, the information corresponding to television channels J-N is displayed in the cells of the region corresponding to television channels. Because information corresponding to television channels A-I was previously displayed in the menu screen, and the list of television channels only goes up to N, the information corresponding to only television channels J-N may be displayed in the cells of the region corresponding to television channels. Furthermore, because only several cells are needed to display the requested information, only several cells are displayed on menu screen 1100.

Figure 12B:
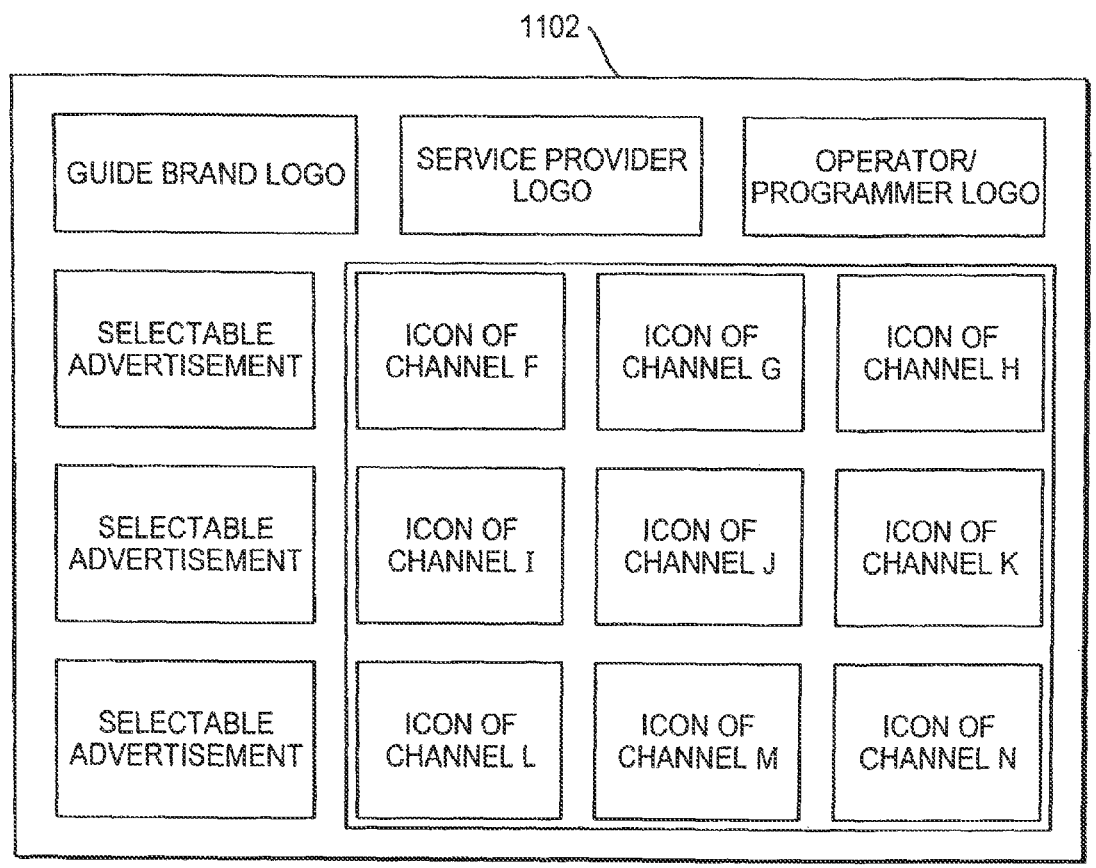
Figure 12C:
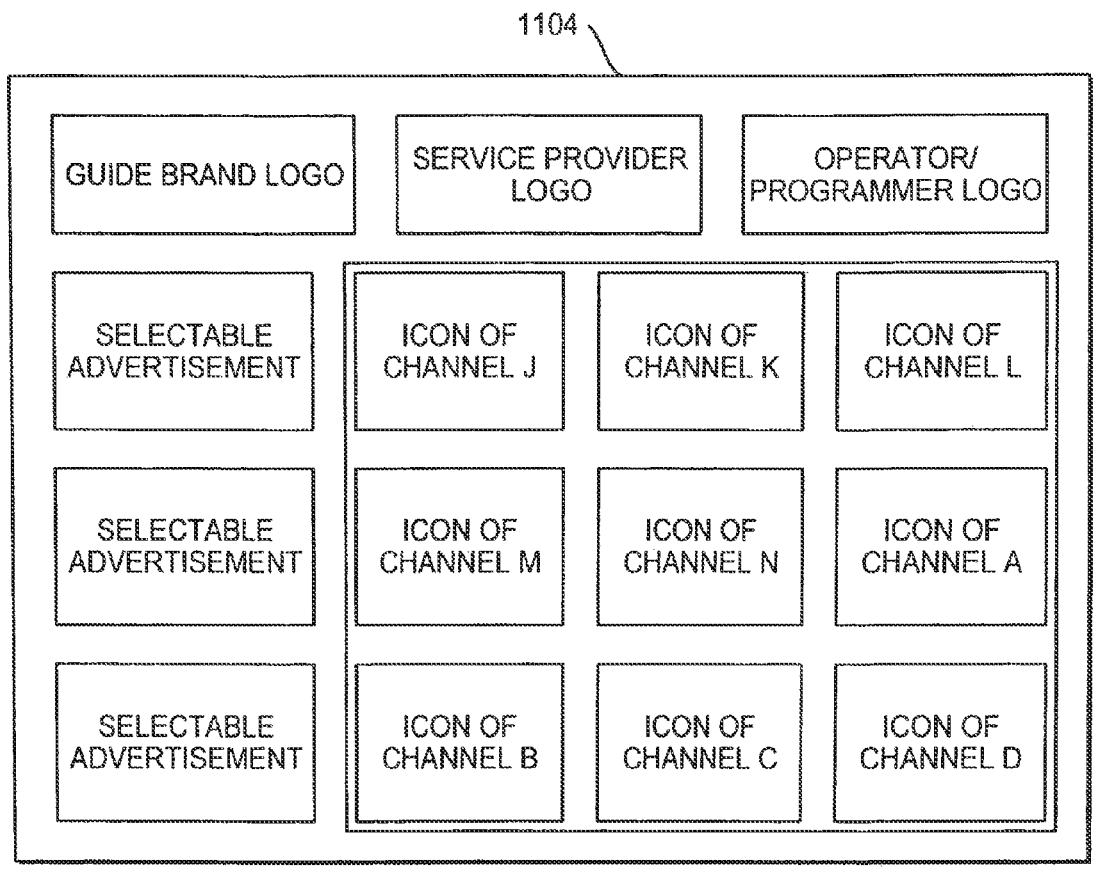

In another suitable approach, entities may be arranged in any suitable sequence. For example, entities may be arranged according to alphabetical order (e.g., by call letters of television channels), according to fees paid by the entities (e.g., the higher the fee, the closer to the beginning of the sequence), or according to any other suitable ordering technique. When the interactive television application is commanded to "page" and the number of entities that remain in the sequence is less than the number of cells that are displayed, the sequence may "wrap around" to the beginning of the sequence. This is illustrated for example in FIGS. 12B and 12C.

This is merely an illustrative way of implementing a process in which the possibility of non-associated cells is avoided. Any other suitable implementations may be used. For example, entities may be selected at random to become associated with the non-associated cells once the end of the sequence is reached. If desired, the non-associated cells may display any suitable default content such as advertisements, weather information, or any other suitable content.

Figure 13:
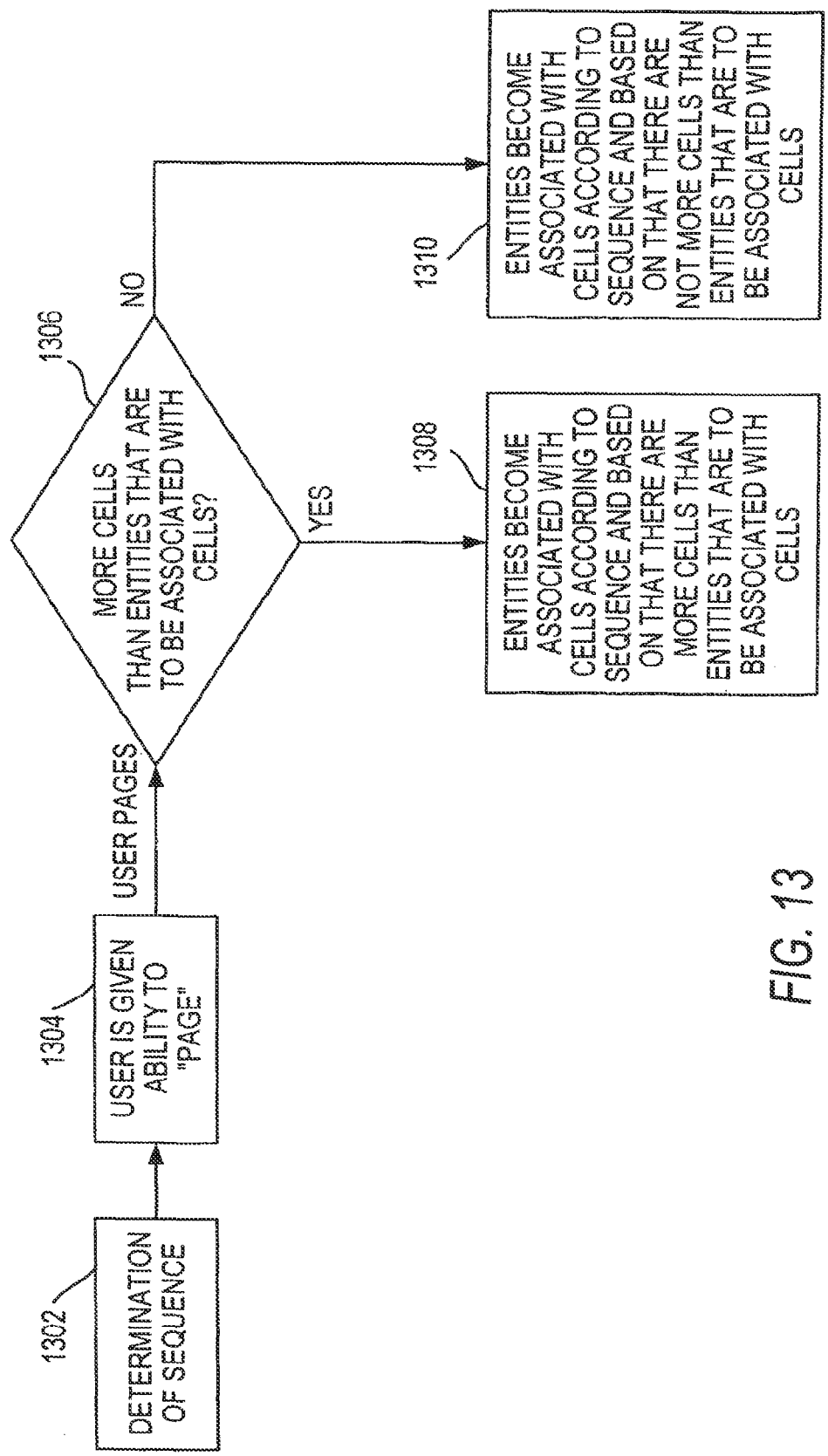
FIG. 13 is a flow chart of illustrative steps for the determination of how entities are to be associated with cells if the interactive television application is commanded to "page" in accordance with the principles of one embodiment of the present invention.

FIG. 13 is a flow chart of illustrative steps for the determination of how entities are to be associated with cells if, for example, the interactive television application is commanded to "page." At step 1302, a sequence for associating cells and entities may be determined At step 1304, the user may be given the ability to "page." Once the user "pages," a determination may be made at step 1306. At step 1306, it is determined if there are more cells than entities that are to be associated with cells. If there are more cells than entities, entities may become associated with cells according to the sequence determined at step 1302 and based on that there are more cells than entities that are to be associated with cells. This may occur at step 1308. If there are not more cells than entities, entities may become associated with cells according to the sequence determined at step 1302 and based on that there are not more cells than entities that are to be associated with cells. This may occur at step 1310. These steps are merely illustrative. Any other suitable technique may be used to determine how entities are to be associated with cells if the interactive television application is commanded to "page."

In one suitable embodiment of the present invention, when the user navigates among the cells of a region individually, and the user attempts to navigate to a direction in which there are no more entities that are to be associated with the cells of that region (e.g., at the beginning or end of a list), a region in the direction to which the user attempted to navigate may be navigated to. If, however, there are no regions to which the user may navigate in the direction in which the user attempted to navigate, the region to which the user navigates may be the region on the opposite side of the menu screen. That is, the navigable region may "jump" or "wrap around" to the opposite side of the menu screen. The cells of this region may be navigated among individually. In such an embodiment, there may be no cell in focus in the region to which the user has navigated. In an alternative embodiment, there may be a cell in focus in the region to which the user has navigated. This cell may be a cell that is approximately the same distance from an edge of a menu screen as the cell that was in focus (e.g., in the same row or column of cells). Any other suitable cell may become the cell in focus.

Figure 14A:
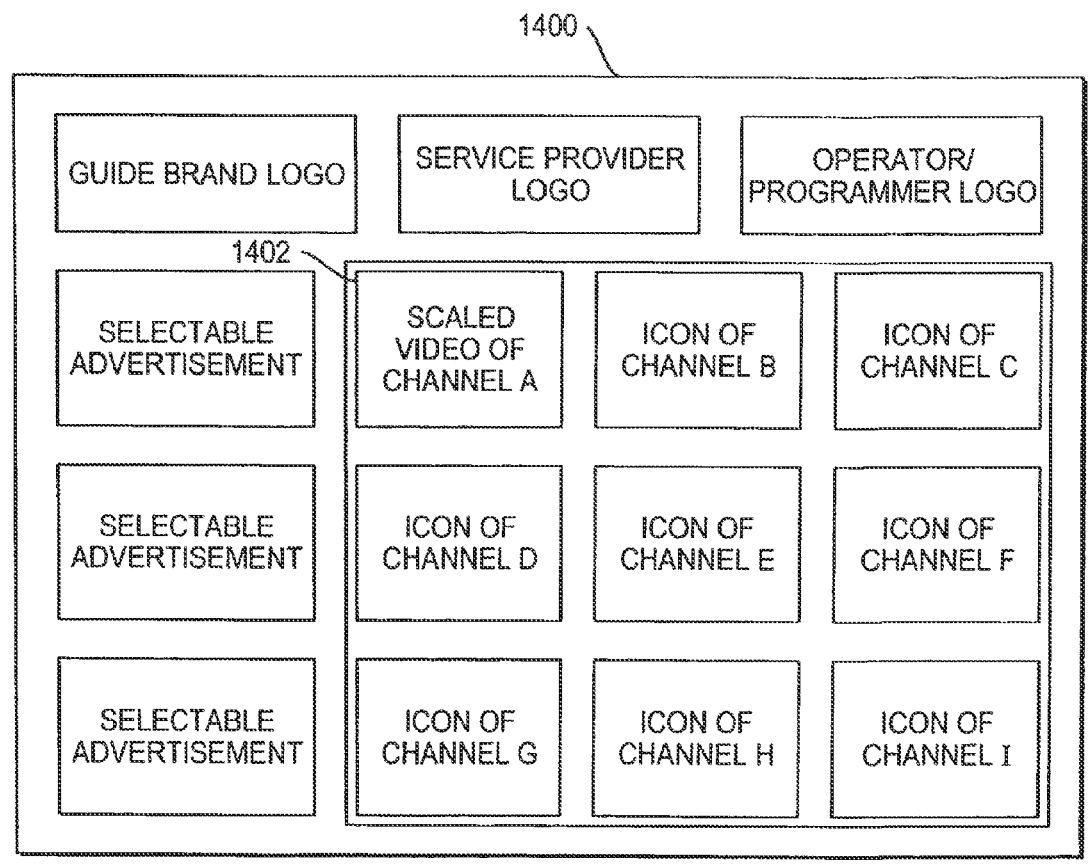
FIGS. 14A, 14B, 14C, and 14D show illustrative menu screens in which the focus automatically moves to another region in accordance with the principles of one embodiment of the present invention.
Figure 14B:
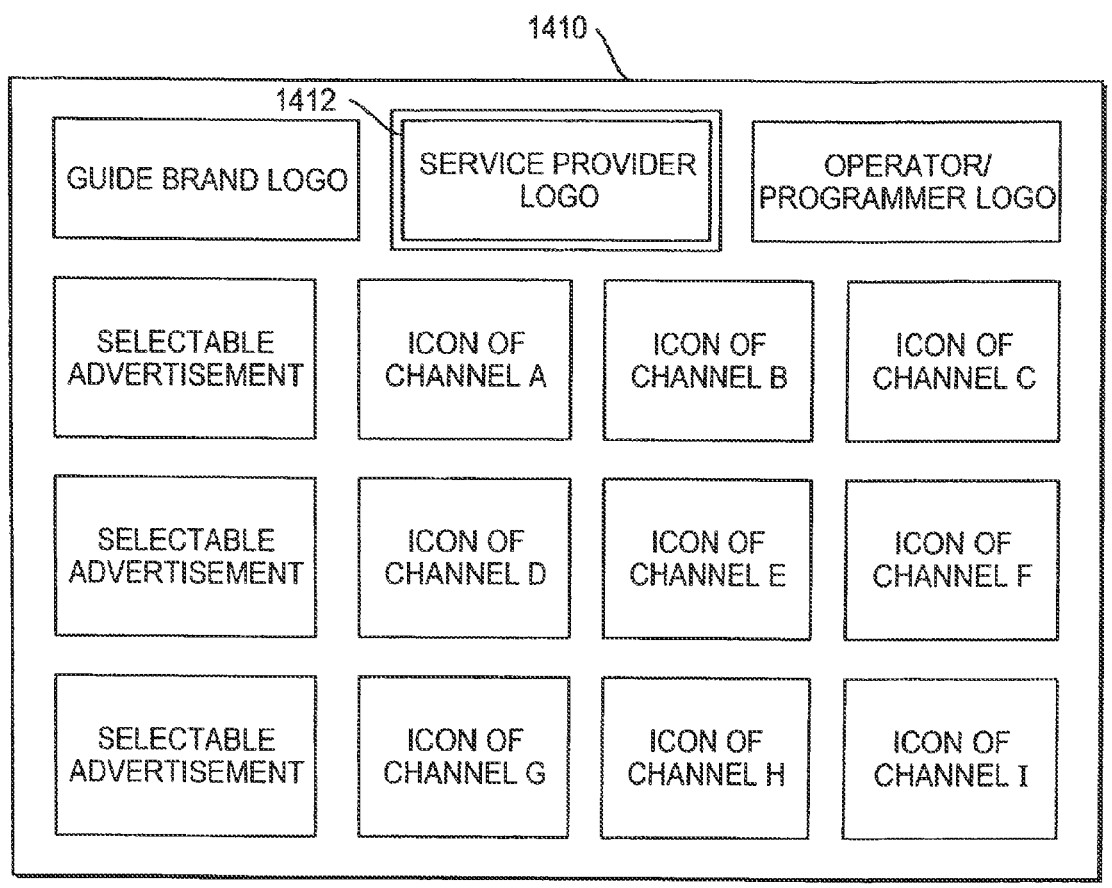

In the illustrative embodiments of FIGS. 14A, 14B, 14C and 14D, for example, the list of television channels begins at television channel A and ends at television channel I. As shown in illustrative menu screen 1400 of FIG. 14A, cell 1402 is the cell in focus. In the illustrated embodiment, if the user pressed the up arrow on remote control 22, for example, illustrative menu screen 1410 of FIG. 14B may be displayed. As shown in FIG. 14A, the cell in focus was associated with the first entity in a list of entities (i.e., television channel A). Because the user pressed the arrow key in the direction of the beginning of the list, the cell in focus automatically moved out of the region in which the user was navigating and moved to another region. As shown in FIG. 14B, the region which includes cell 1412 may be the region to which the user has navigated. As shown in FIG. 14B, cell 1412 may now be the cell in focus. In another suitable embodiment, there may be no cell in focus.

Figure 14C:
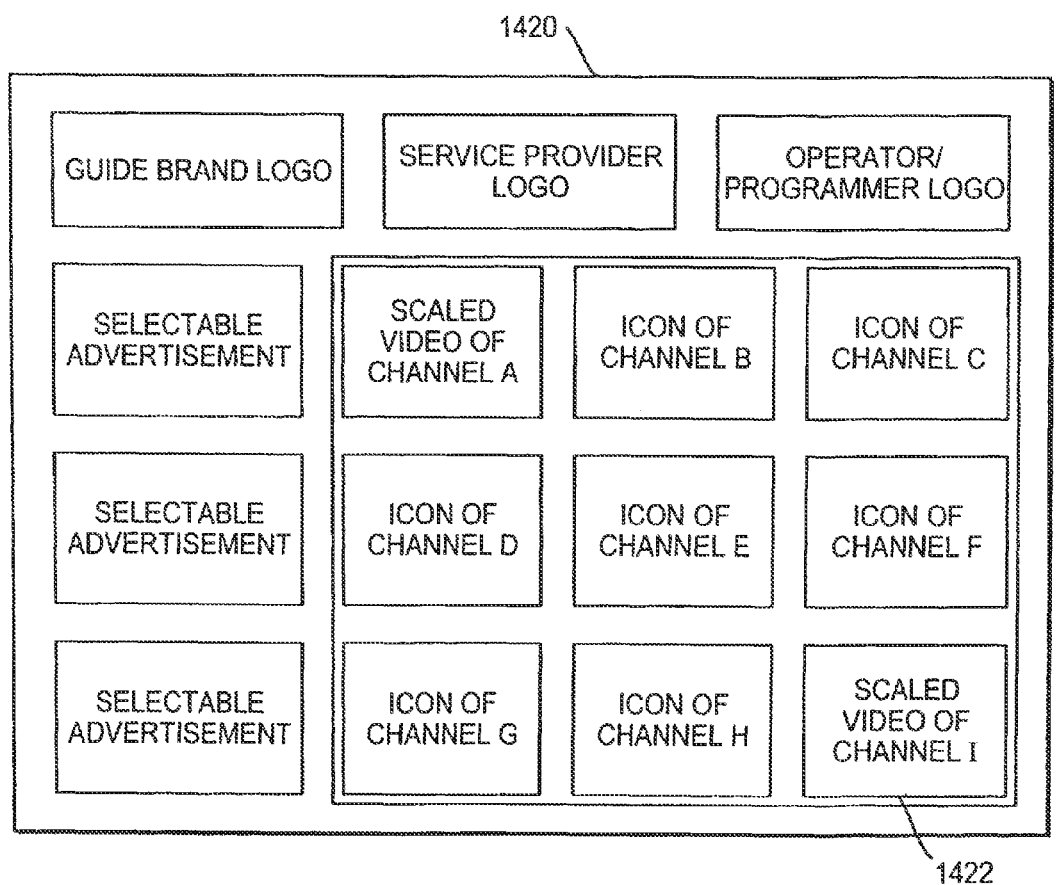
Figure 14D:
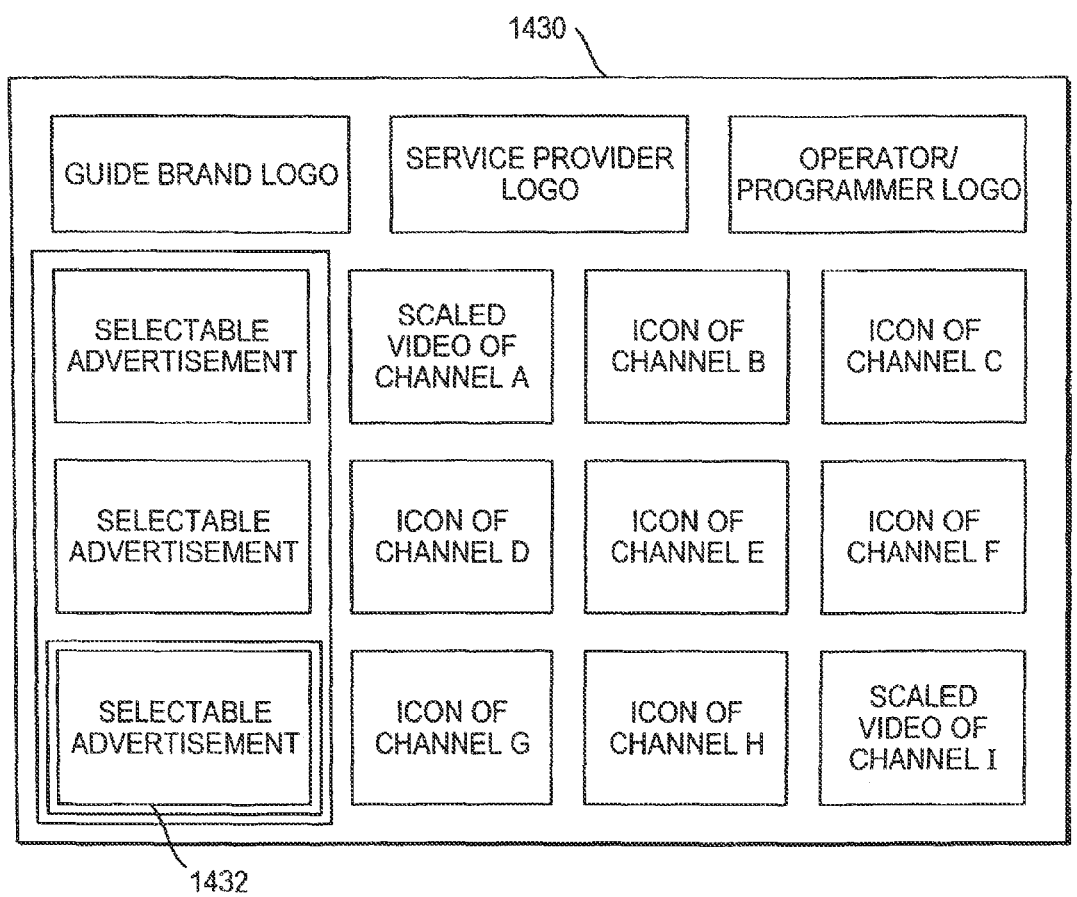

As shown in illustrative menu screen 1420 of FIG. 14C, cell 1422 is the cell in focus. Cell 1422 is associated with the last entity in a list of entities (i.e., television channel I). If the user were to press the right arrow key on remote control 22 for example (i.e., a direction in which there are no more entities to be associated with the cells of the region), illustrative menu screen 1430 of FIG. 14D may be displayed. Because there were no more entities to be associated with the cells of the region in the direction to which the user attempted to navigate, the navigable region "jumped" or "wrapped around" to the opposite side of the menu screen. As shown in FIG. 14D, the region which includes cell 1432 may be the region to which the user has navigated. As shown in FIG. 14D, cell 1432 may now be the cell in focus. In an alternate embodiment, there may be no cell in focus. These examples are merely illustrative. Any suitable embodiment in which the navigable region or focus may move from a region to another may be used.

In embodiments in which entities may become associated and disassociated with cells, each region may have one cell that will be in focus when the user is navigating among the individual cells of that region. This one cell may be any suitable cell. If an entity becomes disassociated with a cell and re-associated with the cell in focus, information (i.e., corresponding to the re-associated entity) that would otherwise not have been displayed if the cell was not in focus may be displayed (e.g., currently broadcasting a television program).

Figure 15:
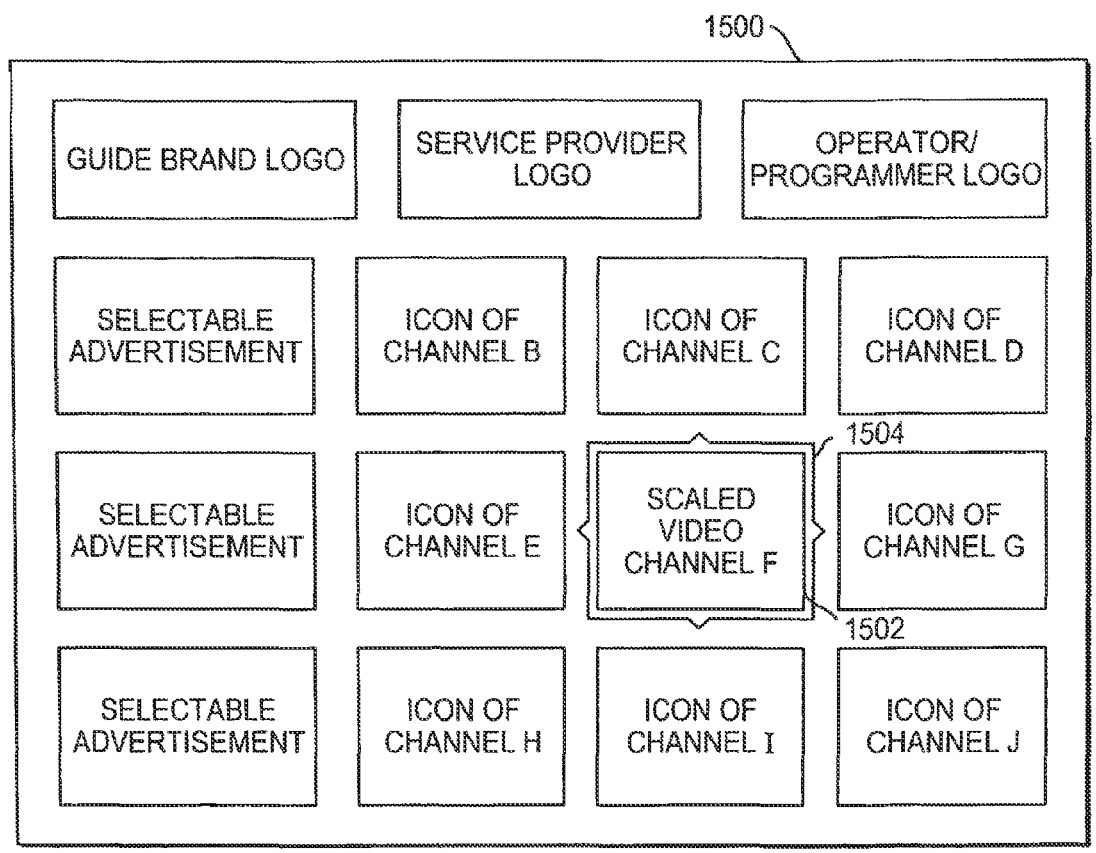
FIG. 15 shows an illustrative menu screen in which a particular cell may automatically be in focus when the user navigates to a region in accordance with the principles of one embodiment of the present invention.

In menu screen 1500 of FIG. 15 for example, cell 1502 may always be the cell in focus if the user has navigated to the region corresponding to, for example, television channels. If menu screen 400 of FIG. 3 were displayed and the user pressed the right arrow on remote control 22 for example, menu screen 1500 may be displayed. In this embodiment, television channel F becomes associated with cell 1502. As a result, scaled video for television channel F, for example, may be displayed in cell 1502. A highlight such as highlight 1504 may be displayed around or in proximity to the cell in focus.

Figure 16:
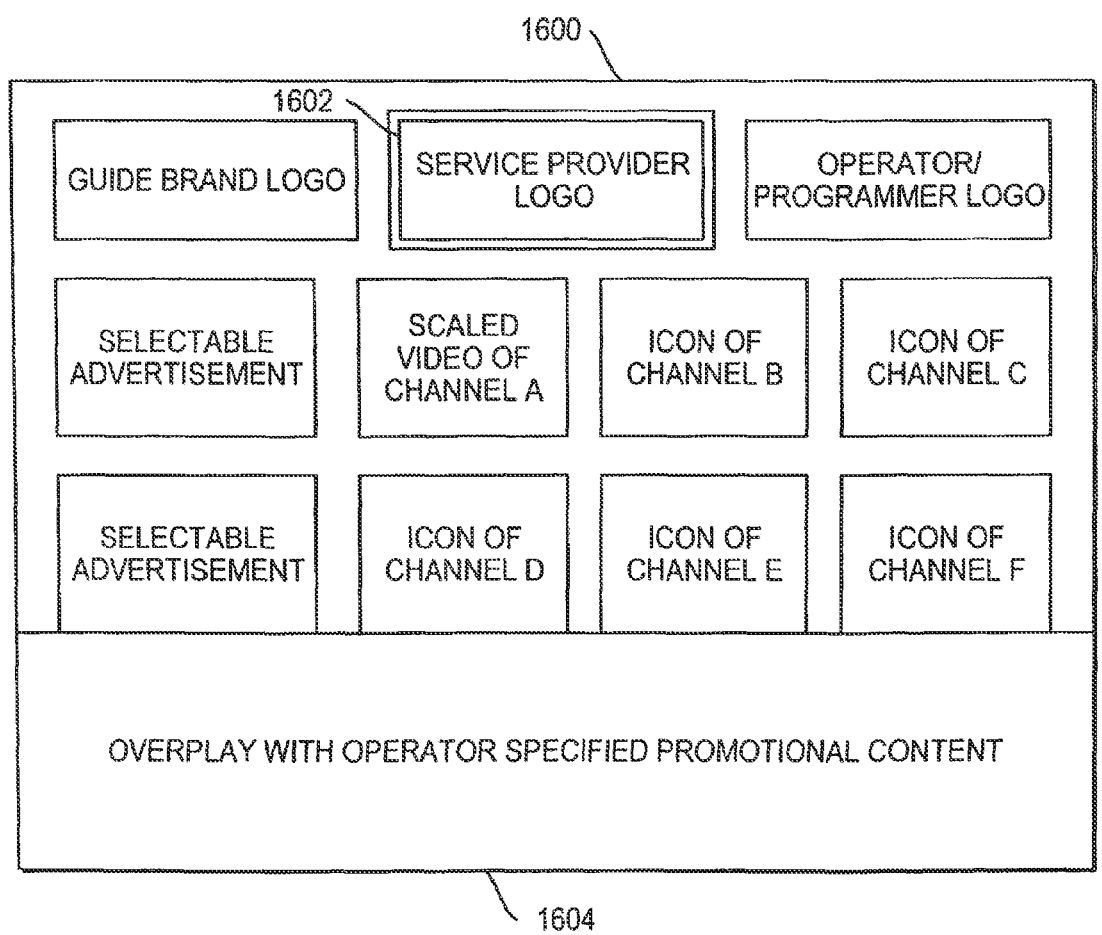
FIG. 16 shows an illustrative menu screen in which an overlay that displays operator specified promotional content is provided when a user navigates to a cell in accordance with the principles of one embodiment of the present invention.

As shown in FIG. 16, when the user navigates to a cell, an overlay such as overlay 1604 may be displayed. Overlay 1604 may be any suitable size and may be displayed over any suitable portion of a menu screen. In FIG. 16, for example, overlay 1604 is displayed over the bottom portion of menu screen 1600. An overlay such as overlay 1604 may be displayed over any portion of a menu screen such that the cell or region to which the user has navigated may still be visible. That is, where the overlay is displayed may differ depending on the cell to which the user has navigated.

For example, when the cell to which the user navigates is on the left side of the menu screen, the overlay may be displayed on the right side of the menu screen. By way of this arrangement, the view of the cell to which the user has navigated is not obstructed. As shown in FIG. 16, for example, content for cell 1602 (i.e., the cell to which the user has navigated) is displayed in overlay 1604. As shown, overlay 1604 is displayed on the opposite side of menu screen 1600 with respect to cell 1602.

In an alternative embodiment, when an overlay such as overlay 1604 is displayed, the overlay may always be displayed on the bottom or any other pre-determined portion of a menu screen. In embodiments in which the overlay may be displayed over a portion of a cell or displayed over an entire cell, the overlay may be partially transparent. By way of this arrangement, the cell (or the portion of the cell) that the overlay covers may be partially visible.

An overlay such as overlay 1604 may display any suitable content. Such content may be operator specified promotional content. For example, if the user were to navigate to a cell associated with an advertisement, an overlay displaying pictures or information of the associated product may be displayed.

Figure 17:
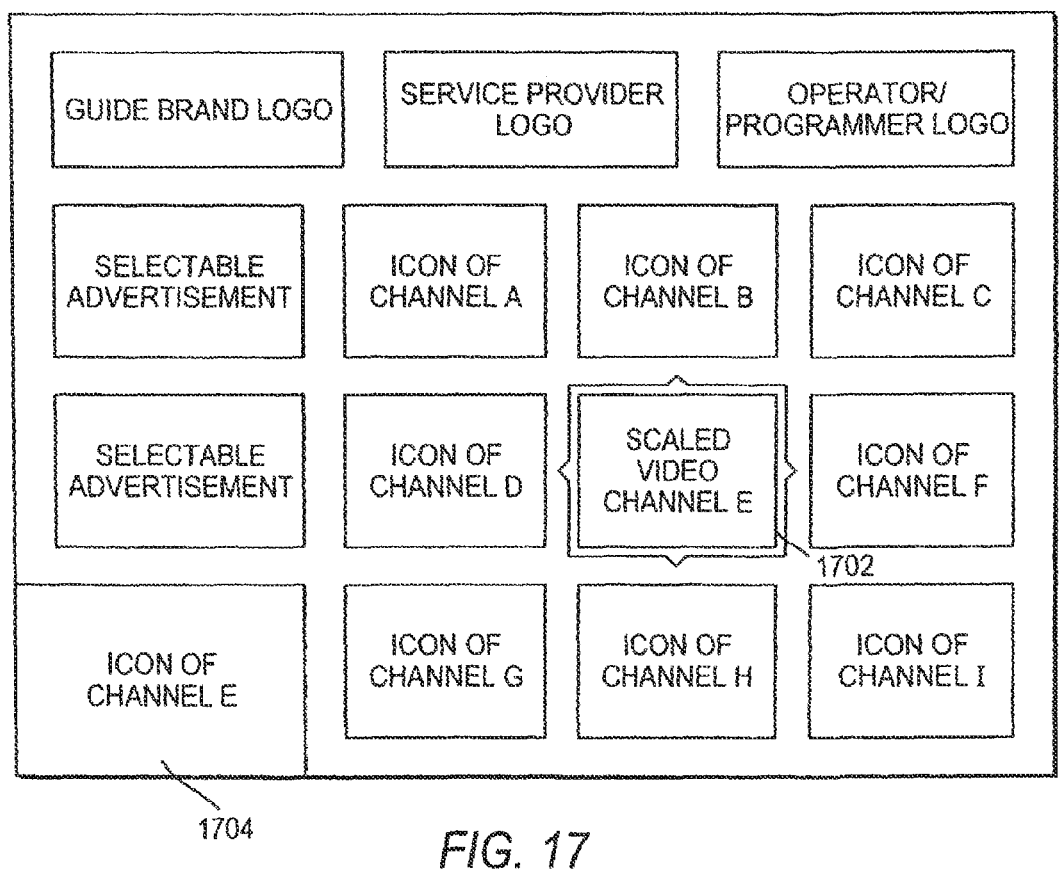
FIG. 17 shows an illustrative menu screen in which an overlay that displays a brand mark for the cell to which the user has navigated is provided in accordance with the principles of one embodiment of the present invention.

In another suitable embodiment, the brand mark displayed in a cell before that cell was navigated to may be displayed in an overlay. For example, if the user navigates to a cell with which a television channel is associated, content other than the brand mark (e.g., scaled video) may be displayed in the cell. A brand mark (e.g., icon) of that television channel may be displayed in an overlay. In FIG. 17 for example, the cell to which the user has navigated, cell 1702, is associated with television channel E. As shown in FIG. 17, scaled video is displayed in cell 1702. The icon of television channel E is displayed in overlay 1704.

These examples are merely illustrative. An overlay may be displayed over any portion of a menu screen and may display any suitable content.

When a cell is in focus, the interactive television application may allow the user to initiate a special function, access interactive content, or both. The special function, interactive content, or both may correspond to the entity with which the cell in focus is associated. Special functions may be initiated by, for example, pressing keys on remote control 22. Interactive content may also be accessed by, for example, pressing keys on remote control 22. Such keys may be an "info" key, a "menu" key, an "ok" key, a "select" key, or an "enter" key.

The user may also be provided with the option to "escape" at any time. The "escape" option may allow the user to quit the interactive television application. The user may also select an option such as the "escape" option to return to the interactive television application if, for example, a main menu screen is not being displayed. In an alternative embodiment, an option such as the "escape" option may be selected to display the display screen that was displayed just prior to the display screen that is currently being displayed. Any other suitable option such as a "back" key or a "return" key may be pressed to display the display screen that was displayed just prior to the display screen that is currently being displayed.

The user may be provided with an opportunity to view information associated with a cell by, for example, pressing the "info" key on remote control 22. Pressing the "info" key while a cell is in focus may cause the interactive television application to display information about the entity associated with that cell. The information may be displayed in any suitable format. Links to information, menus, other interactive content, or special functions may be provided. The interactive television application may allow the user to navigate to a link (e.g., by pressing the arrow keys on a remote control) and "select" the link. The interactive television application may allow the user to "select" an option by, for example, allowing the user to press the "select" key, the "ok" key, or the "enter" key on remote control 22. An indicator such as a highlight may be displayed around or in close proximity to the link to which the user has navigated. The interactive television application may allow the user to cease displaying information by, for example, pressing the "info" key again, selecting a link to return to a main menu screen or any other display screen, by pressing the "escape" key, or through any other suitable action.

The information displayed after the "info" key is pressed may be displayed in full screen or in a portion of the display screen. In one suitable approach, the information may be displayed in a portion of a cell, or in an entire cell.

When the "info" key is pressed and the cell in focus is associated with an advertisement, information regarding the advertised product, program or service may be displayed. This information, for example, may include a description of the advertised product, program or service, information regarding purchasing the advertised product, program or service, descriptions of related products, information regarding corporate entities related to the product, program, or service (e.g., manufacturer), or any other suitable information.

When the "info" key is pressed and the cell in focus is associated with a program guide provider, television service provider, television programmer, or any other suitable entity, suitable information regarding the associated entity may be displayed.

When the "info" key is pressed and the cell in focus is associated with, for example, a television channel, information regarding the television channel such as the call letters, names of the chief executive officers, location of the station, and the program operators may be displayed. In an alternative embodiment, information regarding the currently broadcast program may be displayed alone or simultaneously with information regarding the television channel. Information regarding the currently broadcast program may include the title of the program, the start time of the program, the length of the program, the rating (G, PG-13, R, etc.) of the program, information regarding the cast of the program, a description of the program, reviews, or any other suitable information.

Figure 18:
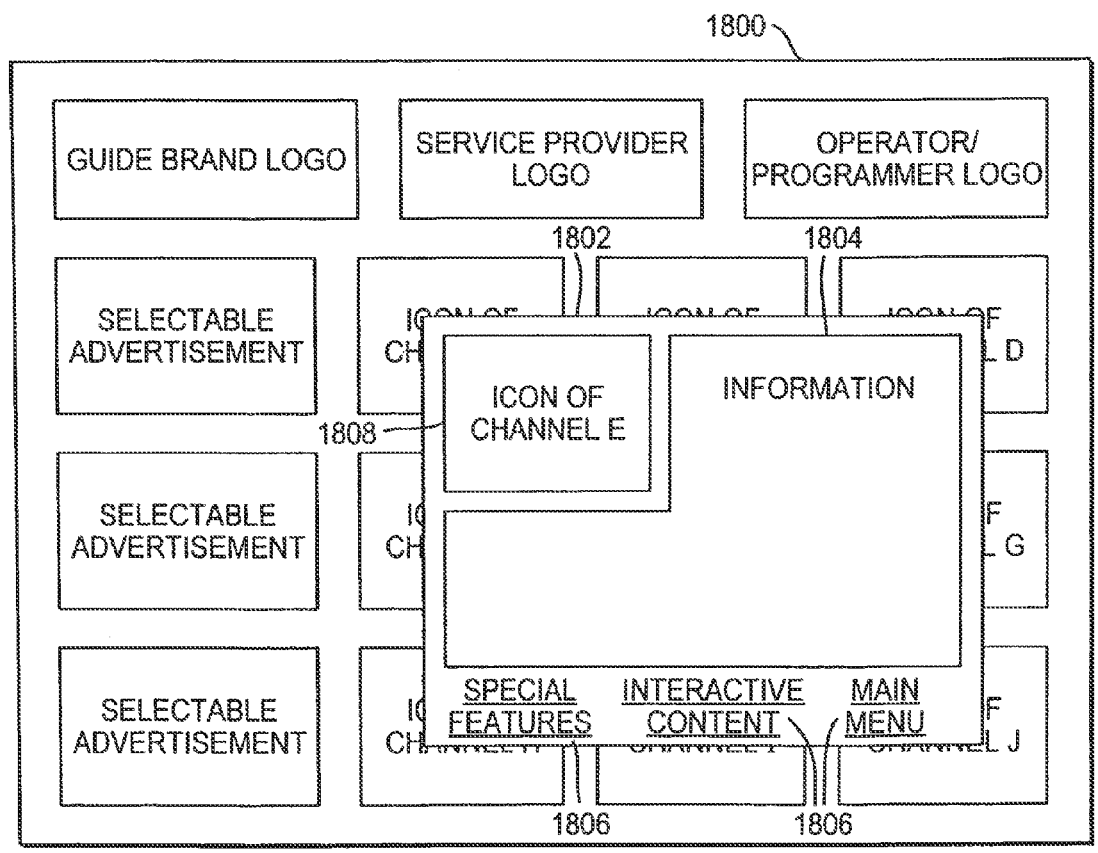
FIG. 18 shows an illustrative menu screen in which information is displayed in a portion of the screen in accordance with the principles of one embodiment of the present invention.

As shown in FIG. 18, illustrative display screen 1800 may be displayed when, for example, the user presses an "info" key on remote control 22. In this illustrative example, the "info" key was pressed when the cell in focus was associated with television channel E. As shown in FIG. 18, the information displayed after the "info" key is pressed may be displayed in full screen or in any suitable portion of display screen 1800 such as portion 1802. In portion 1802, information such as information 1804 may be displayed. Links to more information, menus, other interactive content, special functions, and other suitable links are shown as links 1806. A brand mark of the entity for which information is shown in portion 1802 may also be displayed. For example, the icon for television channel E is displayed in portion 1808 of portion 1802.

The preceding examples are merely illustrative. Any suitable information regarding the entity with which the cell in focus is associated may be provided in response to any suitable user action and may be provided in any suitable way.

An alternate user initiated action may be initiated when, for example, the user presses the "menu" key on remote control 22. Pressing the "menu" key when a cell is in focus may cause the interactive television application to display any suitable menu. The menu may be displayed in any suitable format. Links to information, menus, other interactive content, or special functions may be provided. The interactive television application may allow the user to navigate to a link (e.g., using the arrow keys on a remote control) and "select" the link. The interactive television application allow the user to "select" an option by, for example, pressing the "select" key, the "ok" key, or the "enter" key on remote control 22. An indicator such as a highlight may be displayed around or in close proximity to the link to which the user has navigated. The interactive television application may allow the user to cease displaying the menu by, for example, pressing the "menu" key again or by pressing the "escape" key.

The menu displayed after the "menu" key is pressed may be displayed in full screen or in a portion of the display screen. In one suitable approach, the menu may be displayed in a portion of a cell, or in an entire cell.

When the "menu" key is pressed when a cell is in focus, a suitable menu screen for the entity associated with that cell may be displayed. For example, if the cell in focus is associated with a television channel when the "menu" key is pressed, a menu screen for that particular television channel or family of channels (e.g., ESPN, ESPN2) may be provided. Such a menu screen may have some or all of the elements displayed in other menu screens. Examples of these elements may be indicators and highlights. A menu screen particular to a specific television channel may have listings of the television programs that are currently being broadcast and future television programming. The listings may include program titles, scheduled broadcast times, program descriptions, and any other suitable information. These examples are merely illustrative. The interactive television application may provide any suitable menu screen for an entity when a key such as the "menu" key is pressed. Any suitable elements may be displayed on a menu screen.

The interactive television application may also provide the user with options when the user presses a key such as the "menu" key. These options may be selectable. The user may command the interactive television application to "select" an option by, for example, pressing the "select" key, the "ok" key, or the "enter" key. An indicator such as a highlight may be displayed around or in proximity to the option to which the user has navigated.

When the cell in focus is associated with, for example, a television channel, the menu screen may provide the user with options to record the current program on that channel, order a channel or program (e.g., Pay-Per-View services), set a reminder for a future program, make a channel a favorite channel, or any other suitable options. If, for example, a menu screen is provided for a product, options may be provided such that the user may order the product or obtain more information about the product. These examples are merely illustrative. Any other suitable option may be provided.

Figure 19:
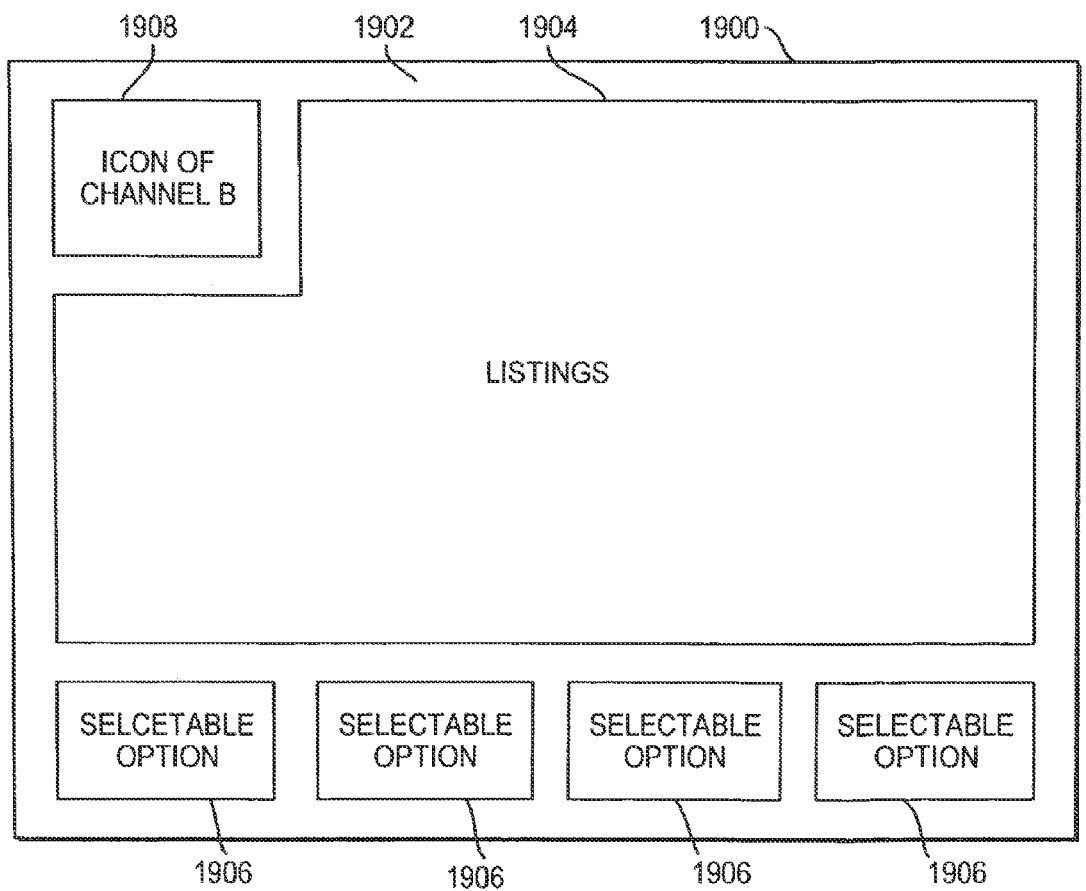
FIG. 19 shows an illustrative menu screen in which a menu is displayed in accordance with the principles of one embodiment of the present invention.

As shown in FIG. 19, illustrative display screen 1900 may be displayed when, for example, the user presses a "menu" key on remote control 22. In this illustrative example, the "menu" key was pressed when the cell in focus was associated with television channel E. As shown in FIG. 19, the menu displayed after the "menu" key is pressed, menu 1902 may be displayed in full screen. Menu 1902 may also be displayed in a portion of display screen 1900. In menu 1902, any suitable information may be displayed in a portion of menu 1902 such as portion 1904. Any other suitable information may be displayed in portion 1904. Selectable options 1906 are also shown in menu 1902. A brand mark of the entity for which information is shown in menu 1902 may also be displayed. For example, the icon for television channel E is displayed in portion 1908 of menu 1902.

The preceding examples are merely illustrative. Any suitable menu regarding the entity with which the cell in focus is associated may be provided in response to a user initiated action.

When a cell is in focus, the interactive television application may allow the user to initiate a special function corresponding to the entity associated with that cell. The interactive television application may also allow the user to access interactive content associated with a cell in focus. For example, the user may press the "ok" key, the "select" key, or the "enter" key on remote control 22 to cause the function to begin. In one suitable embodiment, the interactive television application may allow a user to initiate a special function corresponding to the entity associated with the cell in focus by, for example, pressing the "ok" key, the "select" key, or the "enter" key regardless of whether or not a menu or information screen is currently displayed. In another embodiment, a special function may only be initiated if a menu or information screen is not displayed.

When the cell in focus is associated with, for example, a television channel, and an "enter" key on remote control 22 is pressed, the television program currently being broadcast on that television channel may be displayed in full screen. Any intermediate steps between displaying the scaled video to displaying the video in full screen may be taken. Examples of these intermediate steps include an exploding window, displaying an animated or static graphic, and displaying the icon or logo of the television channel before displaying the television program.

The interactive television application may allow the user to select the cell in focus by pressing the "select" key, the "ok" key, or the "enter" key on the remote control. Pressing the "select" key, the "ok" key, or the "enter" key while a cell is in focus may cause the interactive television application to perform any suitable action. For example, selecting a cell with a television channel associated with it may cause the interactive television program guide to display the video of the television program currently being broadcast on the associated television channel in full screen. Selecting a system operator's brand mark may take the user to a customer service feature. This customer service feature may be a separate menu. The customer service feature may have information such as the location of offices of the system operator, hours of operation, contact information, and any other suitable information. Similarly, selecting any brand mark may take the user to a customer service feature for the associated entity. In another suitable approach, selecting a system operator's brand mark or a program guide's brand mark may take the user to a menu screen associated with the selected brand.

When a cell that is in focus has a web-site associated with the cell (e.g., the entity associated with the cell is a company with a web-site) and the user selects that cell, the interactive television application may activate a web-browser that may display the web-site associated with that cell.

In one suitable approach, the interactive television application may provide users with a "walled-garden." A "walled-garden" may be a pre-determined group of content that may be provided to the user. For example, if a cell is associated with an advertisement, a link to a "walled-garden" related to the advertised product, program, or service may be provided. For example, if the entity associated with a cell is CompanyXYZ, the user may be able to navigate within the "walled-garden" of the CompanyXYZ domain. That is, the user, after selecting the link to the "walled-garden" for CompanyXYZ, may be able to only navigate among web-sites associated with CompanyXYZ, and associated entities. This is merely an illustrative use of a "walled-garden." Any other suitable use of a "walled-garden" may be implemented.

Figure 20:
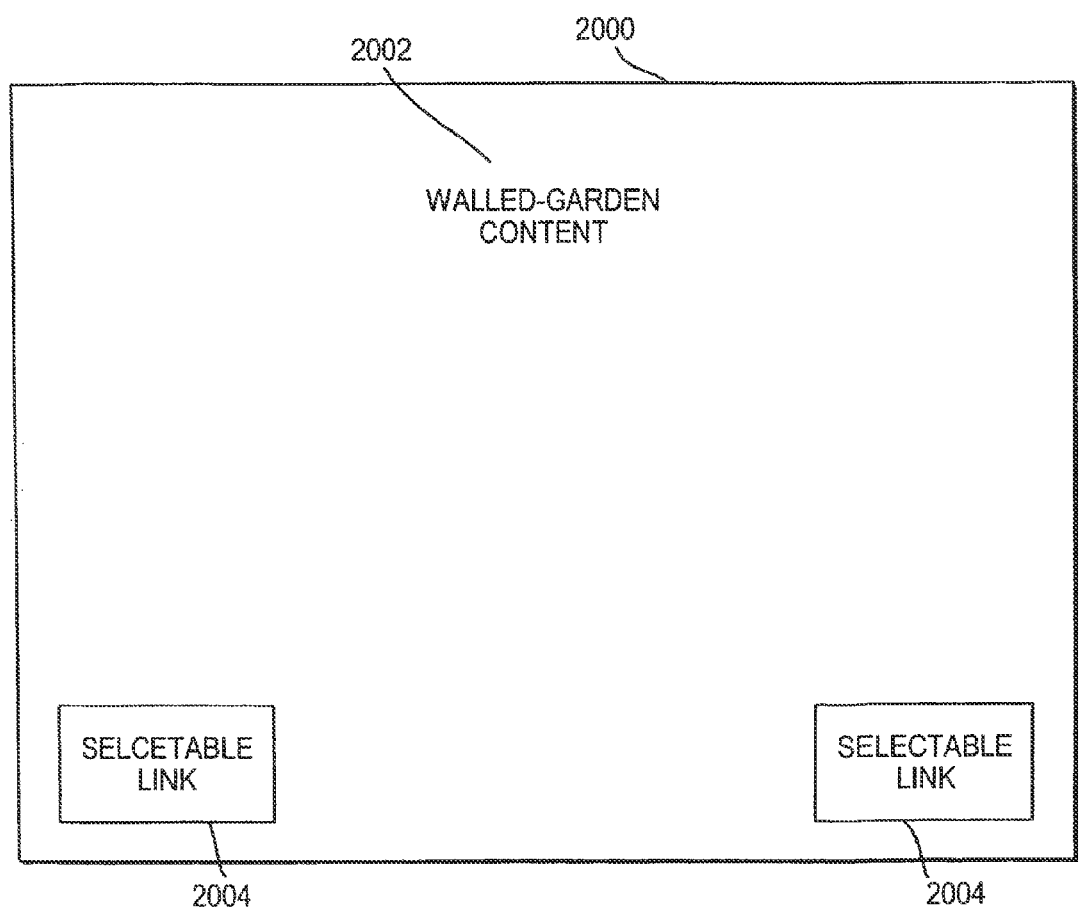
FIG. 20 shows an illustrative screen in which a walled-garden is displayed in accordance with the principles of one embodiment of the present invention.

When the user selects a link to a walled-garden, a display screen such as illustrative display screen 2000 of FIG. 20 may be displayed. A display such as display 2000 may be displayed in full screen as shown, or in a portion of a display screen. As shown in FIG. 20, a walled-garden may display content related to the entity associated with the cell in focus. Such content is content 2002. The walled garden may also display selectable links to other related content and associated entities. Such links are links 2004.

The activation of a web-browser by the interactive television application is merely illustrative. For example, graphics editing, word-processing spreadsheets or any other suitable applications may be activated.

The preceding examples of the interactive television application providing the user with information, an information screen, a menu screen, or any other suitable display may be used. Any suitable approach to provide the user with information, an information screen, a menu screen, or any other suitable display may be used. Any suitable approach to provide the user with suitable options or a way to initiate additional functionality may be used. The preceding examples of the functions associated with specific keys on a remote control are also merely illustrative. The initiation of any function or the display of any display screen or information may be associated with any key on a remote control. Any function or the display of any display screen or information may also be initiated by issuing any other suitable command to the interactive television application.

Figure 21:
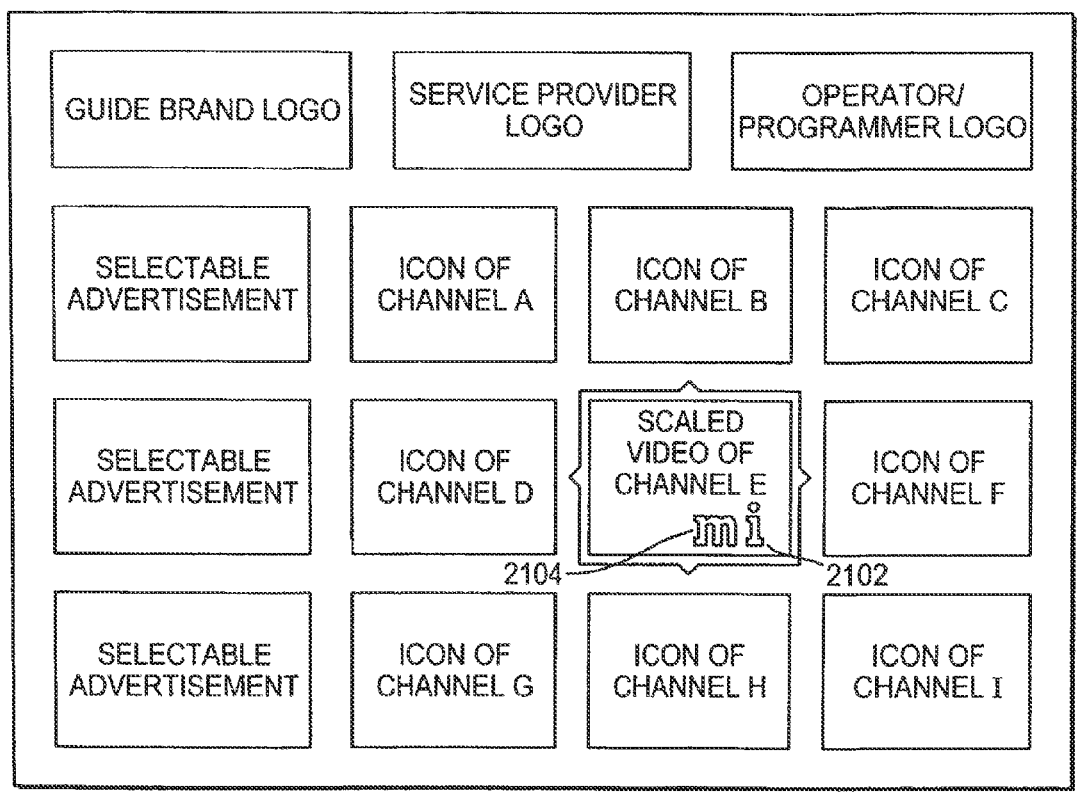
FIG. 21 shows an illustrative menu screen in which icons are provided to notify the user of the opportunity to access interactive content in accordance with the principles of one embodiment of the present invention.

The interactive television application may display indicators in a cell, or in close proximity to a cell, to notify the user that the user may access interactive content or initiate a special function associated with that cell. These indicators may be displayed when a cell is in focus or when a cell is not in focus. In the illustrative display screen shown in FIG. 21, for example, indicator 2102 and indicator 2104 may notify the user of an opportunity to access an information screen and access a menu screen, respectively. The indicator indicating that there may be an information screen associated with a cell, indicator 2102, may be in the shape of an "i" as shown, or any other suitable shape. Indicator 2104 may also be in any suitable shape such as an "m" as shown. For example, an indicator displayed around or in close proximity to a cell may blink or be a pre-determined shape or color to notify the user that the user may access interactive content or initiate a special function associated with that cell. These examples are merely illustrative. Any suitable indicator may be displayed to notify the user that there may be interactive content or additional functionality associated with a cell.

Figure 22:
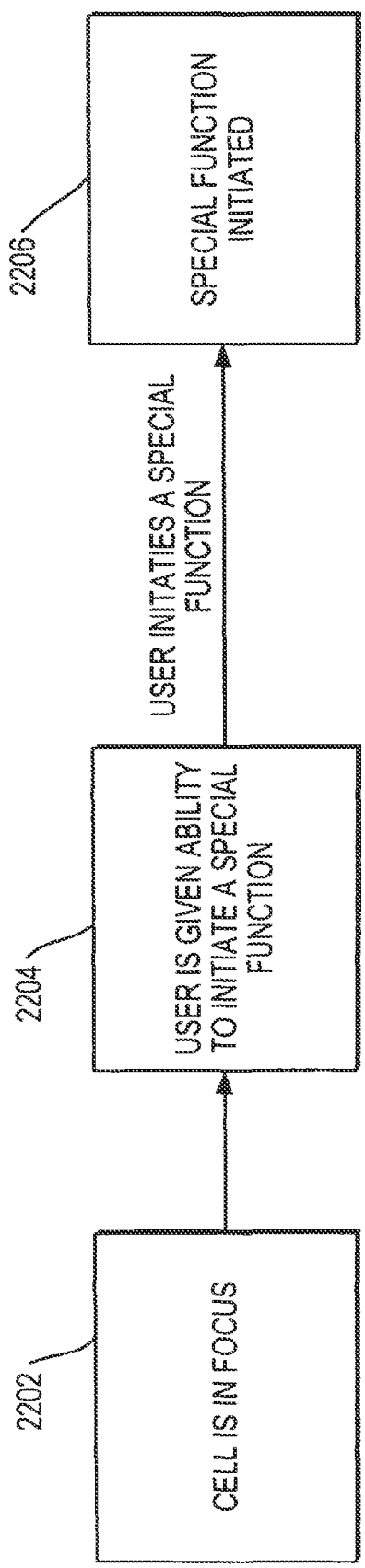
FIG. 22 is a flow chart of illustrative steps that may be taken to initiate a special function in accordance with the principles of one embodiment of the present invention.

FIG. 22 is a flow chart of illustrative steps that may be taken to initiate a special function. At step 2202, a cell is in focus. At step 2204, the user may be given the ability to initiate a special function. Once the user initiates that he would like to initiate a special function, the special function may be initiated at step 2206. This example is merely illustrative. Any suitable approach to initiate a special function may be used.

Thus, an interactive television application with mosaic browsing is provided. One skilled in the art will appreciate that the present invention can be practiced by other than the described embodiments, which are presented for purposes of illustration and not of limitation, and the present invention is limited only by the claims which follow.

What is claimed is:

1. A method for presenting a video mosaic display, the method comprising:
    generating for display, on a display device, an interactive menu featuring a plurality of cells for displaying media asset identifiers, wherein the plurality of cells is grouped into a plurality of regions, and wherein each of the media asset identifiers corresponds to a media asset available via a communications link;
    determining that a first group of cells of the plurality of cells is associated with a first region and that a second group of cells of the plurality of cells is associated with a second region;
    generating for display, on the display device, a first indicator for the first region of the plurality of regions and a second indicator for the second region of the plurality of regions, wherein the first indicator graphically indicates that the first region is individually navigable, and wherein the second indicator graphically indicates that the second region is individually navigable;
    receiving, via a user input interface, a user input focusing on the first indicator; and
    based on the user input focusing on the first indicator, scrolling through the first group of cells without scrolling through the second group of cells.

2. The method of claim 1, further comprising:
    receiving a first user selection of a first cell associated with a first media asset identifier of the plurality of media asset identifiers, wherein the first cell is associated with the first region; and
    based on receiving the first user selection, generating for display the first media asset identifier in a second cell, wherein the second cell is located in the second region of the plurality of regions.

3. The method of claim 2, further comprising:
    receiving a user input focusing on the first cell; and
    based on receiving the user input, generating for display an overlay, wherein the overlay includes information associated with the first media asset identifier.

4. The method of claim 3, wherein the overlay is generated for display at a predetermined location relative to the first cell.

5. The method of claim 3, wherein receiving the user input focusing on the first cell causes a graphic associated with the first cell to change.

6. The method of claim 3, wherein receiving the user input focusing on the first cell causes a graphic associated with playback of the first media asset identifier to be generated for display in the first cell.

7. The method of claim 1, wherein the first indicator is an arrow icon.

8. The method of claim 7, wherein the first indicator is generated for display based on a user input focusing on the first region.

9. The method of claim 1, further comprising cross-referencing a database listing media asset identifiers associated with the first region to determine media asset identifiers associated with the first group of cells.

10. The method of claim 1, wherein scrolling through the first group of cells comprising wrapping around the first group of cells within the first region.

11. A system for presenting a video mosaic display, the system comprising control circuitry configured to:
    generate for display, on a display device, an interactive menu featuring a plurality of cells for displaying media asset identifiers, wherein the plurality of cells is grouped into a plurality of regions, and wherein each of the media asset identifiers corresponds to a media asset available via a communications link;

determine that a first group of cells of the plurality of cells is associated with a first region and that a second group of cells of the plurality of cells is associated with a second region;

generate for display, on the display device, a first indicator for the first region of the plurality of regions and a second indicator for the second region of the plurality of regions, wherein the first indicator graphically indicates that the first region is individually navigable, and wherein the second indicator graphically indicates that the second region is individually navigable;

receive, via a user input interface, a user input focusing on the first indicator; and based on the user input focusing on the first indicator, scroll through the first group of cells without scrolling through the second group of cells.

12. The system of claim 11, wherein the control circuitry is further configured to:

receive a first user selection of a first cell associated with a first media asset identifier of the plurality of media asset identifiers, wherein the first cell is associated with the first region; and based on receiving the first user selection, generate for display the first media asset identifier in a second cell, wherein the second cell is located in the second region of the plurality of regions.

13. The system of claim 12, wherein the control circuitry is further configured to:

receive a user input focusing on the first cell; and based on receiving the user input, generate for display an overlay, wherein the overlay includes information associated with the first media asset identifier.

14. The system of claim 13, wherein the overlay is generated for display at a predetermined location relative to the first cell.

15. The system of claim 13, wherein the control circuitry configured to receive the user input focusing on the first cell is further configured to cause a graphic associated with the first cell to change.

16. The system of claim 13, wherein the control circuitry configured to receive the user input focusing on the first cell is further configured to cause a graphic associated with playback of the first media asset identifier to be generated for display in the first cell.

17. The system of claim 11, wherein the first indicator is an arrow icon.

18. The system of claim 17, wherein the first indicator is generated for display based on a user input focusing on the first region.

19. The system of claim 11, wherein the control circuitry is further configured to cross-reference a database listing media asset identifiers associated with the first region to determine media asset identifiers associated with the first group of cells.

20. The system of claim 11, wherein scrolling through the first group of cells comprising wrapping around the first group of cells within the first region.

* * * * *